United States Patent
Macmullan et al.

(10) Patent No.: US 11,234,135 B2
(45) Date of Patent: Jan. 25, 2022

(54) AUTOMATED FREQUENCY COORDINATION FOR SHARED SPECTRUM WIRELESS SYSTEMS

(71) Applicant: Federated Wireless, Inc., Arlington, VA (US)

(72) Inventors: Samuel Jay Macmullan, Carlisle, MA (US); Michael Oliver Ghorbanzadeh, Annandale, VA (US); James Ni, Medford, MA (US); Kurt Schaubach, Arlington, VA (US)

(73) Assignee: FEDERATED WIRELESS, INC., Arlington, VA (US)

( * ) Notice: Subject to any disclaimer, the term of this patent is extended or adjusted under 35 U.S.C. 154(b) by 0 days.

(21) Appl. No.: 16/867,164

(22) Filed: May 5, 2020

(65) Prior Publication Data
US 2020/0359229 A1    Nov. 12, 2020

Related U.S. Application Data

(60) Provisional application No. 62/843,741, filed on May 6, 2019.

(51) Int. Cl.
*H04W 16/14* (2009.01)
*H04W 72/04* (2009.01)
(Continued)

(52) U.S. Cl.
CPC .......... *H04W 16/14* (2013.01); *H04W 24/02* (2013.01); *H04W 72/0453* (2013.01);
(Continued)

(58) Field of Classification Search
CPC .......... H04W 72/0453; H04W 72/082; H04W 72/1231; H04W 72/1247; H04W 16/14; H04W 24/02; H04W 84/12
(Continued)

(56) References Cited

U.S. PATENT DOCUMENTS

2014/0086194 A1* 3/2014 Sugahara ............ H04W 28/16
                                                        370/329
2014/0378177 A1* 12/2014 Muraoka ................ H04B 17/21
                                                        455/501
(Continued)

OTHER PUBLICATIONS

International Search Report and Written Opinion issued in corresponding PCT Application No. PCT/US20/32680, dated Jul. 30, 2020 (8 pages).

*Primary Examiner* — William Nealon
(74) *Attorney, Agent, or Firm* — Finnegan, Henderson, Farabow, Garrett & Dunner, LLP

(57) ABSTRACT

Techniques are provided for managing frequency access in a shared spectrum available to a radio local access network (RLAN) in a wireless network. A shared spectrum system may perform operations including retrieving a plurality of parameters for one or more high-priority users in the wireless network; computing, based on the retrieved parameters, a plurality of interference-to-noise power ratio (I/N) contours; storing the plurality of I/N contours in a database; receiving, from an RLAN device in the wireless network, a request for spectrum availability, wherein the received request includes at least a first value; extracting, based on the first value in the request for spectrum availability, an I/N contour from the database matching RLAN parameters; determining, based on the extracted I/N contour, available frequency information corresponding to the received request for spectrum availability; and transmitting, to the RLAN device, the available frequency information.

37 Claims, 16 Drawing Sheets

(51) Int. Cl.
    *H04W 84/12*     (2009.01)
    *H04W 24/02*     (2009.01)
    *H04W 72/08*     (2009.01)
    *H04W 72/12*     (2009.01)

(52) U.S. Cl.
    CPC ..... *H04W 72/082* (2013.01); *H04W 72/1231* (2013.01); *H04W 72/1247* (2013.01); *H04W 84/12* (2013.01)

(58) Field of Classification Search
    USPC .......................................... 370/329; 455/454
    See application file for complete search history.

(56) References Cited

U.S. PATENT DOCUMENTS

| | | | | |
|---|---|---|---|---|
| 2015/0382360 | A1* | 12/2015 | Huang | H04L 1/00 370/329 |
| 2016/0105815 | A1* | 4/2016 | Sugahara | H04L 43/0882 370/252 |
| 2016/0135186 | A1* | 5/2016 | Sun | H04W 72/0453 370/329 |
| 2016/0242031 | A1* | 8/2016 | Ojanen | H04W 28/16 |
| 2017/0111919 | A1* | 4/2017 | Madan | H04W 72/1273 |
| 2017/0208476 | A1* | 7/2017 | Khambekar | H04B 17/318 |
| 2020/0382963 | A1* | 12/2020 | Mueck | H04W 88/08 |

* cited by examiner

AUTOMATED FREQUENCY COORDINATION FOR SHARED SPECTRUM WIRELESS SYSTEMS

CROSS-REFERENCE TO RELATED APPLICATIONS

This application claims the benefit of U.S. Provisional Application Ser. No. 62/843,741, filed on May 6, 2019, the disclosure of which is hereby incorporated by reference in its entirety.

FIELD OF INVENTION

The present invention relates to techniques for shared spectrum access in wireless networks and, more particularly, to methods, systems, and apparatuses for coordinating shared access to spectrum based on interference to at least some users of the shared spectrum.

BACKGROUND

Radio frequency (RF) spectrum is the foundation for many wireless communications systems in use today, including radar and cellular communications systems. Specified frequency ranges, sometimes identified as bands or channels, in the RF spectrum may be allocated for use by different entities, for different purposes, or in different geographic locations. As used in this disclosure, "spectrum" refers to any frequencies, frequency bands, and frequency channels in the RF spectrum that may be used or allocated for wireless communications.

Because the available RF spectrum is finite, frequency allocations in the spectrum are highly valued and often highly regulated. In the United States, for example, the Federal Communications Commission (FCC) and the National Telecommunication and Information Administration (NTIA) regulate and manage spectrum allocations, allotments, and assignments. Frequency allocation is the process by which the entire RF spectrum is divided into frequency bands established for particular types of service. These frequency allocations are then further subdivided into channels designated for a particular service or "allotment." Assignment refers to the final subdivision of the spectrum in which a party (i.e., cellular operator) receives one or more frequency assignments, in the form of a license, to operate a radio transmitter on specific frequency channels within a particular geographic location.

The system of spectrum allocation, allotment, and assignment is failing to keep pace with the increasing demand for spectrum. There is, therefore, a need to improve how the available spectrum can be efficiently allocated, allotted, and assigned in the face of growing demand. Unless otherwise noted, "allocation" is used in the present disclosure to generally refer to the process by which spectrum is allocated, allotted, and assigned.

In view of this increasing demand for spectrum, a dynamic spectrum access (DSA) system may be used to share available spectrum among multiple users. A DSA system, for example, may include a Spectrum Access System (SAS) that manages access to a shared spectrum, such as the 3.5 GHz band recently made available for commercial use in the United States. In another example, a DSA system may be used to share access to unlicensed spectrum, such as Television Whitespace (TVWS). Coordinating and managing multi-user access to a shared spectrum present challenges in a DSA system.

There has been research and development of computer-automated techniques for the optimization and organization of spectrum allocation in standalone wireless networks, e.g., Self-Organizing Network (SON) techniques in $3^{rd}$ Generation Partnership Project (3GPP) networks. A SON may comprise one or more interconnected standalone networks, e.g., sharing access to at least one SAS. These standalone networks typically use a single radio access technology, such as described in the 3GPP standards for Long Term Evolution (LTE). Further, these networks are usually managed by a single operator, e.g., Verizon or AT&T, which has an exclusive license to use a portion of spectrum in a geographical area.

As wireless demands grow, shared spectrum usage is becoming more common, e.g., in TVWS bands and in the 3.5 GHz Federal band. In these environments, a SAS may control spectrum access among users assigned to different priority levels (or "tiers") of spectrum-access privileges. The SAS may implement spectrum management policies for users in each tier. For example, the SAS may be configured to protect spectrum usage by higher-priority "primary users" in shared bands from harmful interference that would result from communications by lower-priority "secondary users." In some cases, such high-priority users may comprise "incumbent" users, such as military or other government users, that had access to a spectrum before that spectrum was shared with other "non-incumbent" users. As used herein, a "user" may refer to a user equipment (such as a mobile phone) or a person using a user equipment as will be apparent in context. In many cases where there are relatively few primary users, spectrum usage by primary users is low, so secondary users can dominate overall resource usage. Nonetheless, in regions with primary users, the SAS should ensure that any spectrum allocations to secondary users will not create unacceptable levels of interference with the primary users.

To assist the SAS with spectrum management, base stations serving secondary users are often required by regulation (e.g., FCC requirements) to share their operating parameters (e.g., location, antenna characteristics, desired operating power, air interface technology, requested data rates) and measurements (e.g., neighboring base station interference, overall interference, bit/block/frame error rates, latencies, buffer status) with the SAS. Secondary users may also opt to share operating parameters and measurements with the SAS, since such sharing may result in improved secondary user performance.

Citizens Broadband Radio Service (CBRS) shared-spectrum systems are currently being deployed to provide commercial use of 150 MHz of spectrum in the 3.5 GHz band, and new bands such as the 6 GHz band (5.925 to 7.125 GHz) may soon be available for shared spectrum use. To expedite the rollout of services in new shared spectrum bands, software systems used to coordinate shared access of these bands and protect band incumbents must be simple and capable of rapidly determining spectrum availability at a particular location. Moreover, what is needed is a solution tailored to 6 GHz shared spectrum coordination using an approach that also may be easily adjusted for use in other bands, e.g., by modifying the propagation model, protected incumbents, and protection criteria.

A wireless communication device is generally referred to herein as a radio local access network (RLAN) device, whereas a shared spectrum controller (e.g., SAS) is referred to herein as an Automatic Frequency Coordinator (AFC) or AFC controller. In some implementations, the wireless network may comprise one or more 6 GHz RLAN devices and the AFC may be a shared spectrum controller, such as an SAS, for managing access to spectrum in the 6 GHz band. As used herein, RLANs may comprise non-incumbent users that share access to spectrum with higher-priority incumbent users in a wireless network. In some embodiments, an RLAN may refer to an RLAN device in a wireless network. In some embodiments, RLAN device may refer to an access point (AP), such as a WiFi AP, and/or a base station. Additionally or alternatively, RLAN device may comprise a transmitter and a receiver. In some embodiments, RLAN clients may refer to clients and/or user equipment (UE). Additionally or alternatively, RLAN clients may comprise a transmitter and a receiver. In some embodiments, RLAN device may be capable of sharing any necessary information associated with its RLAN clients to the AFC and disseminating a response from the AFC to its RLAN clients.

More than 100,000 incumbents of the 6 GHz band that require protection from RLAN interference are registered in the Federal Communications Commission (FCC) Universal Licensing System (ULS) database. The ULS database includes, for example, the location, frequency, and other characteristics of incumbent receivers that should be protected from interference from other users. Additional incumbents, e.g., those not included in the ULS database, can also be protected given incumbent-associated protection criteria.

SUMMARY

The present invention overcomes the disadvantages of the prior art by providing techniques for managing frequency access in a shared spectrum available to at least one RLAN device in a wireless network. In view of the increasing demand for spectrum while protecting incumbent receivers from interference resulting from non-incumbent RLAN transmissions in a wireless network, the exemplary embodiments disclosed herein provide a shared-spectrum AFC controller that, unlike prior systems, can determine RLAN spectrum availability, for example, based on at least one RLAN-reported location and/or other RLAN characteristics and/or incumbent information. The disclosed embodiments may be used by one or more AFCs to provide incumbent-protection methods and techniques consistent with this disclosure.

The disclosed embodiments comprise, for example, methods, systems, and computer-readable mediums that may be used by one or more AFCs for managing frequency access in a shared spectrum available to at least one RLAN in a wireless network. The disclosed embodiments may include at least one AFC configured to retrieve a plurality of parameters for one or more high-priority users in the wireless network, wherein the plurality of parameters includes location and frequency information associated with each of the one or more high-priority users. In some embodiments, the plurality of parameters may be retrieved, for example, from a universal licensing database. The high-priority users may comprise at least one incumbent user that had access to a frequency range in the shared spectrum before that range was included in the shared spectrum.

The disclosed embodiments further may include an AFC that is configured to compute, based on the retrieved parameters, a plurality of interference-to-noise power ratio (IN) contour values; store the plurality of I/N contour values in a database; receive, from the RLAN in the wireless network, a request for spectrum availability, wherein the received request includes at least a first value; extracting, based on the first value in the request for spectrum availability, I/N contour values from the database exceeding a threshold value; determine, based on the extracted I/N contour values, available frequency information corresponding to the received request for spectrum availability; and transmit a spectrum availability response comprising the available frequency information. The threshold value may be any suitable value, for example, selected from one of −6 dB, 0 dB, or 10 dB. In some embodiments, the AFC may transmit a spectrum availability response that further includes interference information, such as relating to one or more extracted I/N contour values. Further, the first value in the request for spectrum availability may comprise a horizontal uncertainty value or a vertical uncertainty value, for example, used to determine an RLAN impact area. In some embodiments, the AFC may be configured to compute a distance from the RLAN to one or more I/N contours, which may correspond to an RLAN impact area. In other embodiments, the AFC may be configured to compute the RLAN Impact Area for use in determining the set of incumbents with interference caused by the RLAN and/or one or more of its clients. The disclosed embodiments may use a centralized database solution operating on exclusion zones, for example determined based on one or more I/N contours, that may offer a coordination framework that provides improved simplicity and responsiveness for an AFC to manage a shared spectrum.

In addition, some embodiments may be configured to determine, based on an RLAN antenna gain, an indication of RLAN power in a direction of a high-priority user; and further may compute, based on the determined indication of RLAN power, the plurality of the I/N contour values. Some embodiments may be configured to determine, based on the available frequency information and a location of the RLAN, an above ground level (AGL) height of the RLAN; and then may compute, based on the AGL height and an RLAN power, an RLAN impact area. In some embodiments, the AFC may be configured to transmit, if the RLAN is determined to be located at a distance less than a horizontal uncertainty value from an extracted I/N contour value, an indication in the spectrum availability response that at least one frequency channel is unavailable in the wireless network. In other embodiments, the AFC may be configured to transmit to the RLAN, if the corresponding RLAN Impact Area intersects with one or more extracted UN contours, an indication in the spectrum availability response that at least one frequency channel is unavailable in the wireless network. In some embodiments, the spectrum availability response may include information for identifying at least one high-priority user in the RLAN vicinity or at least one change in spectrum availability in the wireless network.

BRIEF DESCRIPTION OF THE DRAWINGS

The accompanying drawings, which are incorporated in and constitute a part of this disclosure, illustrate various exemplary disclosed embodiments. In the drawings.

DETAILED DESCRIPTION OF DISCLOSED EMBODIMENTS

Figure 1:
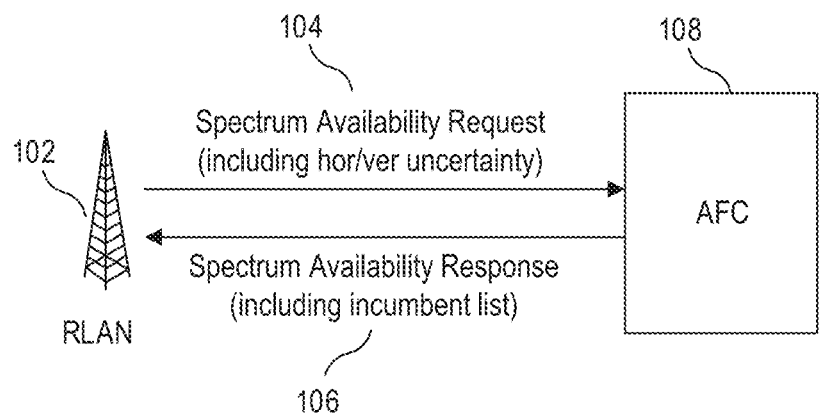
FIG. 1 depicts a schematic block diagram of an exemplary spectrum availability request system that may be used in accordance with certain disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

FIG. 1 illustrates a schematic block diagram of an exemplary spectrum availability request system 100 that may be used in accordance with certain disclosed embodiments. In the proposed system, an RLAN 102 may request spectrum availability information and access to a frequency channel in a shared spectrum by sending a spectrum availability request 104 to the AFC 108. In response, the AFC 108 may return a spectrum availability response 106 to the RLAN 102 as shown in FIG. 1.

Figure 4:
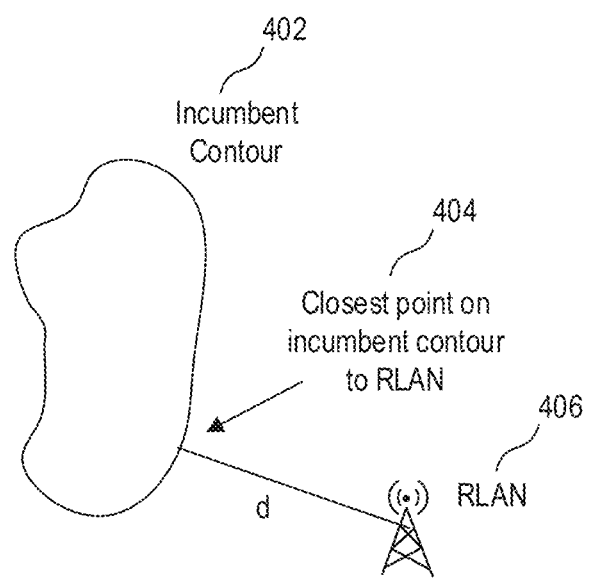
FIG. 4 depicts a schematic block diagram of a distance from an RLAN to an exemplary I/N contour for an incumbent user in accordance with certain disclosed embodiments.

Further to the disclosed embodiment, the AFC 108 may control interference levels for high-priority incumbent users (as shown in FIG. 4) based on an exclusion zone around each incumbent (I/N contour). Advantageously, the AFC 108 may reduce its computational complexity compared to prior implementations and can provide responses to a RLAN service requests, for example, in less than 1 second. In some embodiments, the AFC 108 may be configured to use a secure RESTful interface with messages encoded using JavaScript Object Notation (JSON) sent using the Hyper Text Transfer Protocol (HTTP) Secure (HTTPS) protocol (HTTP over Transport Layer Security (TLS)). In such exemplary embodiments, the use of a RESTful interface may simplify integration with the RLAN 102's user interface and maximize the AFC's interface reliability and scalability.

According to some disclosed embodiments, a ULS (such as, for example, ULS 502 in FIG. 5) may include point-to-point 6 GHz wireless links to communicate with a specified receiver and transmitter location, and the AFC may be configured to protect the receiver from RLAN interference. In some embodiments, the receiver may correspond to a high-priority user, such as an incumbent user. In the context of the examples described below, an "incumbent receiver" refers to a receiver used by an incumbent user. For each incumbent receiver, several I/N contours may be calculated offline and stored in an AFC database (such as, for example, an incumbent contour database 506 in FIG. 5). By limiting real-time operations to database accesses and exclusion-zone checks based on stored I/N contours, the AFC's responsiveness may be greatly improved and its complexity may be substantially reduced.

The I/N contour may represent an area over which the RLAN 102 operating on an incumbent frequency and transmitting power in a direction of an incumbent receiver, would cause excess interference to the incumbent receiver. In some embodiments, the I/N contour may correspond to a geographic boundary where the I/N levels are above a selected I/N threshold value for an incumbent receiver. Specifically, the I/N contour may represent the locations where the RLAN 102 transmission would cause the overall I/N value at the incumbent receiver to exceed a specified interference threshold, e.g., which may be −6 dB, 0 dB, or 10 dB in some exemplary embodiments. Such a threshold value may be determined to cause significant degradation to the incumbent receiver's communications performance.

Contours for several I/N levels (e.g., −6 dB, 0 dB, 10 dB) may be computed offline and stored in the AFC database. The I/N contour calculation may use the reported RLAN effective isotropic radiated power ($EIRP_{RLAN}$) in the direction of the incumbent receiver, determined from an amount of conducted power and an assumed RLAN antenna gain in the direction of the incumbent receiver. Also employed in the I/N contour calculation may be one or more of the path loss (PL) between the incumbent receiver and RLAN antenna, the requested RLAN frequency, and the incumbent receiver's antenna gain in the direction of the RLAN ($G_{incumbent \rightarrow RLAN}$).

In Accordance with such disclosed embodiments, a quantity "I" may then be computed, in dBm, using the following equation:

$$I = EIRP_{RLAN} - PL + G_{incumbent \rightarrow RLAN}$$

Figure 2:
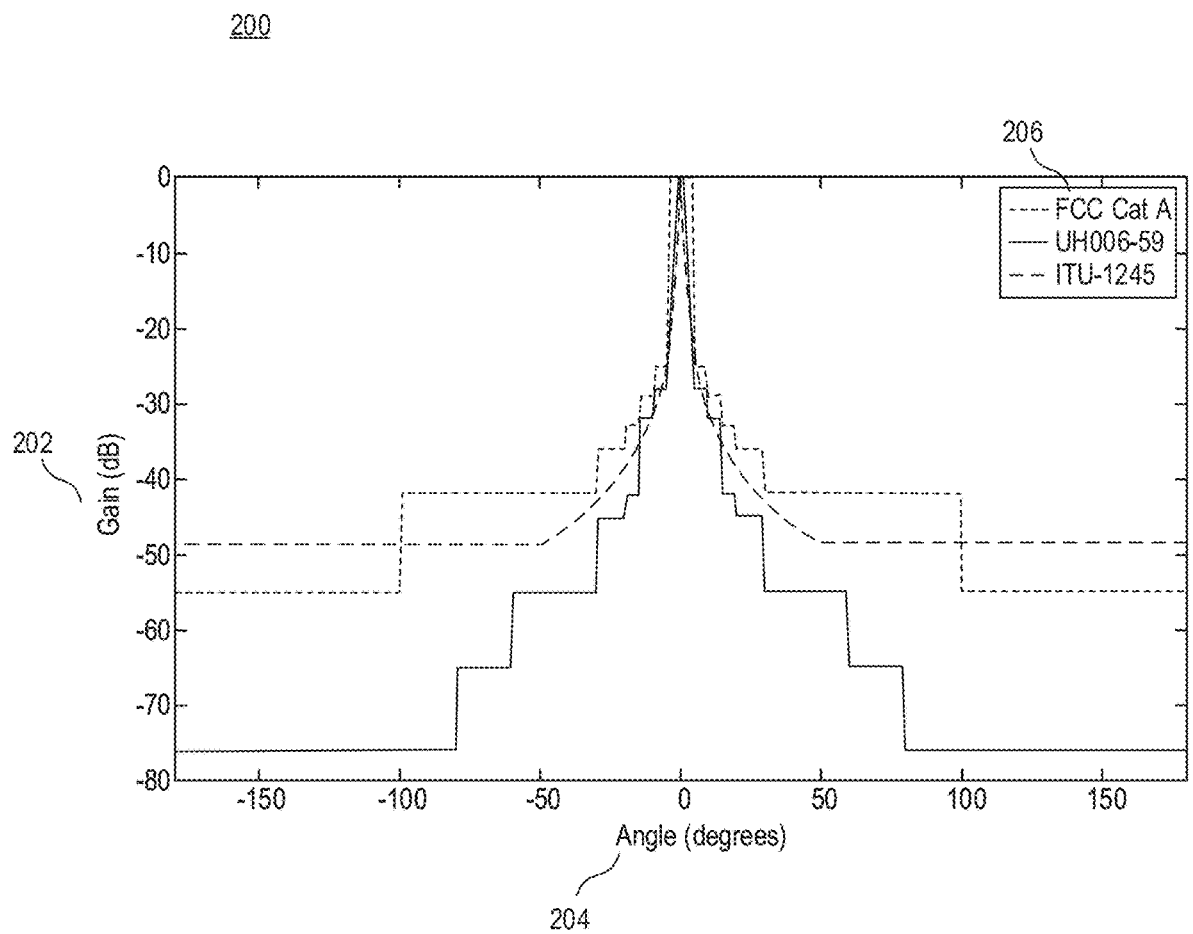
FIG. 2 is a graph of exemplary antenna gains as a function of angles that may be used by an AFC in accordance with certain disclosed embodiments.

FIG. 2 is a graph 200 of exemplary antenna gains as a function of angles for AFC 108 in accordance with certain disclosed embodiments. Graph 200 includes off-boresight angle (degrees) 204 on the X-axis and relative gain (dB) 202 on the Y-axis. In FIG. 2, the legend 206 identifies different antenna patterns that correspond to the antenna-gains vs. angles shown in the graph. An incumbent-receiver antenna azimuth angle may be determined based on the receiver and transmitter locations in the point-to-point link specified in the ULS. Given the incumbent receiver antenna azimuth angle, an AFC-stored antenna pattern may be used to determine $G_{incumbent \rightarrow RLAN}$, i.e., the incumbent antenna pattern relative to the antenna boresight. An antenna pattern such as F.1245 may be used initially in this calculation, though the proposed framework may allow leveraging any other antenna patterns, such as one specified in terms of an antenna gain (in dB) in 1 degree increments relative to boresight and across off-boresight angles between −180 and 180 degrees (e.g., UH006-59, FCC Cat A), as depicted in FIG. 2, or in alternative embodiments, may correspond to a 3D antenna pattern.

In some disclosed embodiments, I/N contours may be derived using path loss determined by the propagation model (e.g., Irregular Terrain Model (TR 15-517), WINNER II) and leveraging terrain elevation and clutter (land cover) data as specified in R2-SGN-05. Though alternative contour generation techniques, one or more of terrain elevation data, land cover data, and path loss computations additionally or alternatively may be employed to determine I/N contours. For instance, in some embodiments, a path loss computation could account for whether the RLAN is indoors or outdoors, information reported by the RLAN, or information determined by the AFC based on the RLAN's location.

The effective noise, N, may be estimated using a configurable noise figure, such as, for example, 5 dB. To provide the RLAN with helpful information regarding spectrum availability and, additionally or alternatively, to ensure incumbents are protected from interference from RLAN clients, the AFC may also compute an RLAN Impact Area starting with an estimate of the RLAN coverage area determined using the RLAN location, Above Ground Level (AGL) height, and EIRP, the propagation model, and a specified RLAN cell edge power level. The impact area may be the area over which the power transmitted by the RLAN and received by a hypothetical receiver with an omnidirectional antenna would be greater than or equal to the RLAN cell edge power level. In some embodiments, the coverage area may be calculated where a power level threshold, the RLAN cell edge power level, would be used to specify the contour edges. The resulting coverage contour may be specified in a length 360 array with each point representing the coverage distance relative to the RLAN location in a particular angular direction, for example, with respect to a reference direction such as True North. The RLAN Impact Area can be made more conservative by adding an extra horizontal uncertainty to the coverage contour which was computed using the propagation model. In other embodiments, the RLAN Impact Area computed using other approximations can be used. For example, in some embodiments, the RLAN Impact Area may be made more conservatively be defining a circle with a radius estimated as the maximum RLAN coverage range given by the RLAN device capabilities.

Figure 3:
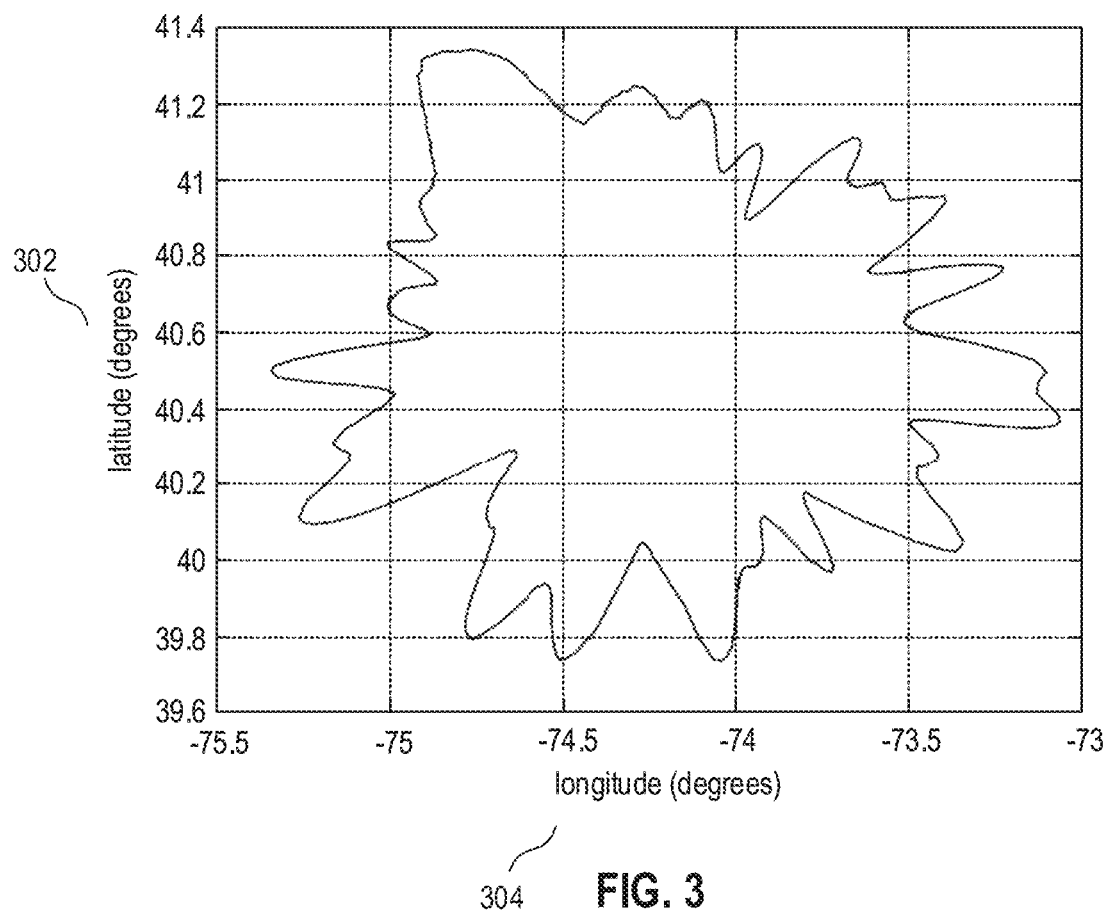
FIG. 3 is a graph of an exemplary RLAN impact area contour based on an interference-to-noise power threshold that may be used in accordance with certain disclosed embodiments.

FIG. 3 provides an example of an RLAN Impact Area in accordance with certain disclosed embodiments. FIG. 3 illustrates a graph 300 with latitude (degrees) 302 on the Y-axis and longitude (degrees) 304 on the X-axis.

To process an RLAN Spectrum Availability Request 104, the AFC 108 may extract from its database a single I/N contour for each incumbent receiver ("incumbent"). The extracted contour may depend on the required I/N threshold for that incumbent and RLAN EIRP and AGL height plus an optional RLAN vertical uncertainty. The I/N contours may be stored for a finite number of discrete EIRPs and AGL heights. EIRPs of [20, 24, . . . , 36] dBm and heights of [20, 40, . . . 100] m may be used initially. In some embodiments, the incumbent contour calculation may use EIRP and height as per the spectrum availability logic to determine:

$$\text{EIRP\_lookup} = \max\left(20, \min\left(36, \text{ceil}\left(\frac{EIRP}{4.0}\right) * 4\right)\right) \text{heigh\_lookup}$$
$$= \max\left(20, \min\left(100, \text{ceil}\left(\frac{height + verUncertainty}{20.0}\right) * 20\right)\right)$$

where ceil(x) is the ceiling operation. For example, if 20<=EIRP<=36, the EIRP_lookup may be selected as the value in [20, 24, 28, 32, 36] that is the smallest value larger than or equal to the EIRP. If EIRP>36, EIRP_lookup=36. If EIRP<20, EIRP_lookup=20. In this example, if 20<= (height+verUncertainty)<=100, the height lookup may be selected as the value in [20, 40, 60, 80, 100] that is the smallest value larger than or equal to (height+verUncertainty). If height>100, then height lookup=100, and if height<20, the height lookup=20. The EIRP_lookup and height lookup may be used to extract from the incumbent database the I/N contour for each incumbent corresponding to that EIRP and AGL. As used in this context, the "height" refers to AGL height.

In some embodiments, an approach to ensuring incumbent protection may be based on the distance between the RLAN and the set of UN contours. For example, if the RLAN is within a distance less than or equal to the horizontal uncertainty relative to the closest point on the incumbent I/N contour, the incumbent's spectrum may be marked as unavailable, for example, in a Spectrum Availability Response 106 message returned from the AFC 108 to RLAN 102. The AFC may determine the overall requested spectrum availability by considering all incumbents and the spectrum that are unavailable due to interference considerations to each incumbent.

In other words, with the extracted set of contours, the spectrum availability calculation module, for example in the AFC 108, may compute the distance from the RLAN to each I/N contour. If the contour is within horUncertainty of the contour, e.g., in some embodiments where the distance, d, from the RLAN 406 to the closest point on an incumbent's contour 402 is less than or equal to horUncertainty (see FIG. 4), then the spectrum availability calculation module may determine that the RLAN would interfere with this incumbent. In this case, the module would mark the incumbent spectrum, e.g., given in the ULS by a set of "lowerfreq" and "upperfreq" values defining the lower and upper frequencies for the spectrum, as unavailable. In some embodiments, the module may also add this incumbent to a list of incumbent receivers with which the RLAN would interfere.

FIG. 4 depicts a schematic block diagram of a distance from an exemplary RLAN 406 to an incumbent contour 402 in accordance with certain disclosed embodiments. As shown in FIG. 4, the incumbent contour 402 may be determined based on communications by the RLAN 406, and a distance "d" may be calculated to determine the closest point 404 on the incumbent contour to the RLAN 406.

In some embodiments, an approach to determining spectrum availability may rely on the RLAN Impact Area. For example, the AFC 108 may extract from a database an RLAN-matching I/N contour set. Rather than using the distance of the RLAN to the matching I/N contours to determine spectrum availability, the spectrum availability calculation module may determine, from this matching I/N contour set, the matching I/N contours that intersect with the RLAN Impact Area, assuming that the RLAN and/or the RLAN clients would interfere with any incumbent whose I/N contour overlaps the RLAN Impact Area. Accordingly, the AFC 108 may protect incumbents from interference from both the RLAN and the RLAN clients. The RLAN clients may be, for example, mobile devices that operate anywhere within the RLAN Impact Area.

Figure 15:
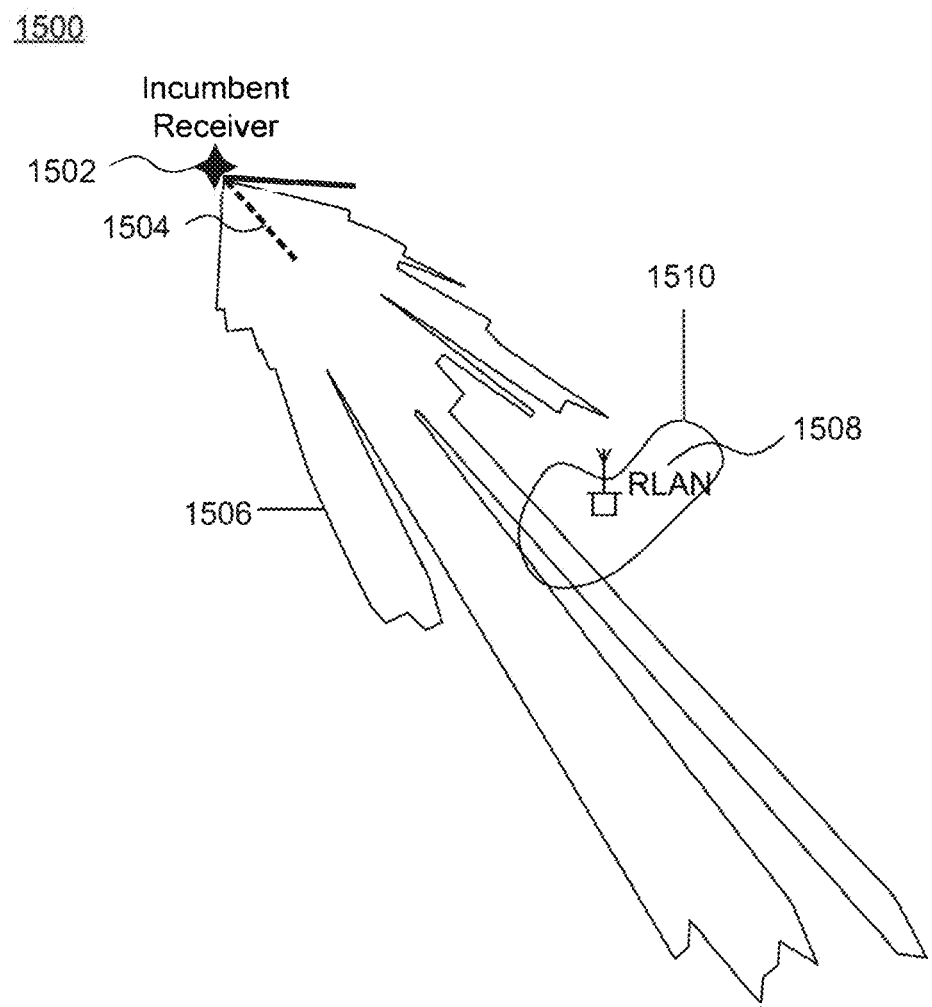
FIG. 15 depicts an alternative approach for determining the set of incumbents to which an RLAN and/or one or more of its clients would cause excess interference, in this case using the AFC computed RLAN Impact Area

FIG. 15 depicts an exemplary approach to determining spectrum availability, in accordance with the embodiments of the present disclosure. As shown in FIG. 15, an AFC, such as AFC 108, may store in a database I/N contours associated with incumbent receiver 1502. Incumbent receiver 1502 may be characterized by receiver antenna pointing direction 1504. Upon a spectrum availability request from RLAN 1508, the AFC 108 may extract I/N contour 1506. I/N contour 1506 may be derived based on RLAN parameters matching those in the RLAN request. Accordingly, extracted I/N contour 1506 may have RLAN parameters that match the RLAN parameters specified in the request from RLAN 1508. The AFC 108 may compute the RLAN Impact Area 1510. If the RLAN Impact Area 1510 overlaps with the I/N Contour 1506, then the operating frequencies of Incumbent Receiver 1502 may be excluded from those declared available by the AFC 108 in its response to RLAN 1508.

Figure 16:
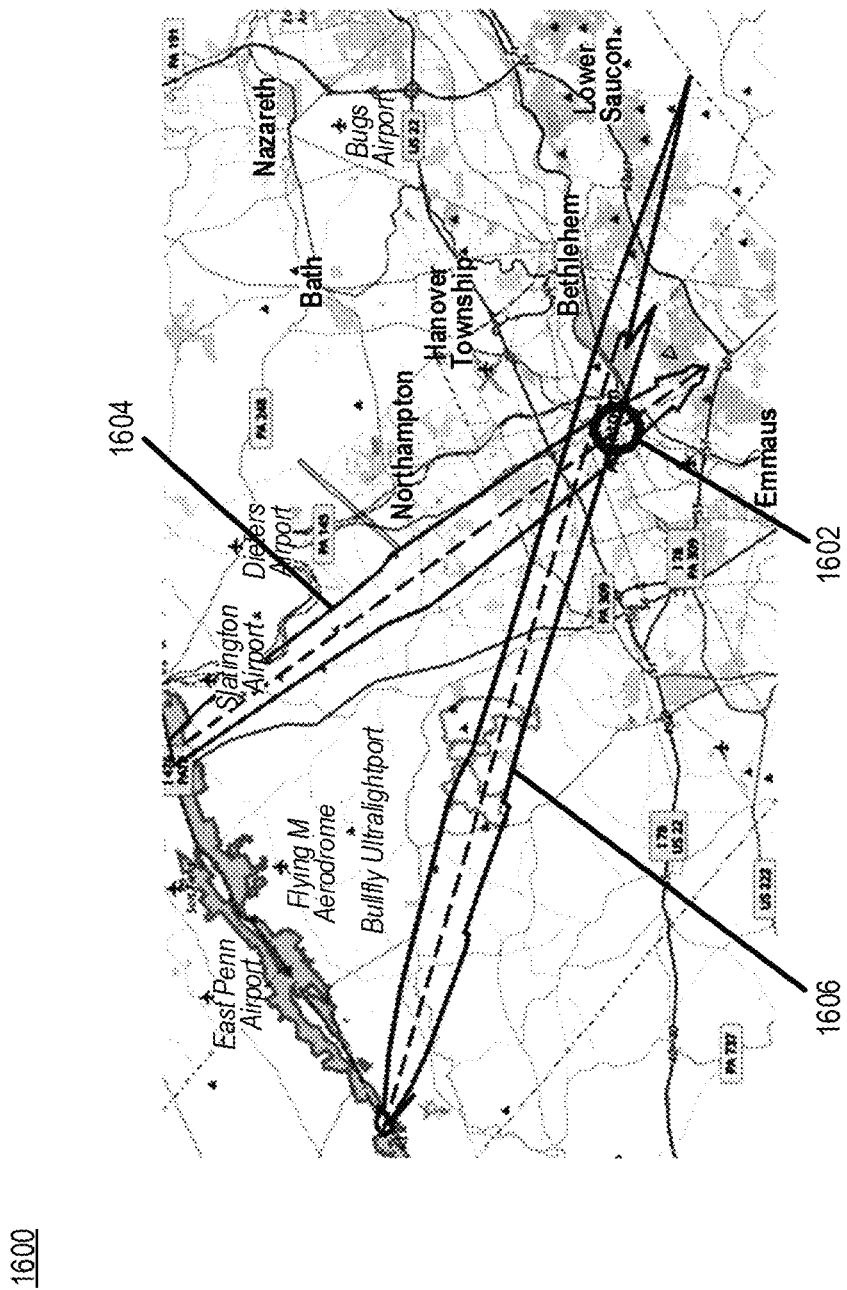
FIG. 16 depicts an alternative approach for determining the set of incumbents to which an RLAN and/or one or more of its clients would cause excess interference, in this case using the AFC computed circular RLAN Impact Area, computed using an estimate of the RLAN coverage distance.

Referring now to FIG. 16, another exemplary approach to determining spectrum availability is depicted, in accordance with the embodiments of the present disclosure. In FIG. 16, an RLAN Impact Area 1602 is illustrated by a circle. In addition, two intersecting contours 1604 and 1606 are found. For example, contour 1606 may be associated with callSign WNEX648 and may operate from 6539.75-6597.5 MHz, and contour 1604 may be associated with callSign WQJV440 and may operate from 6802.5-6807.5 MHz. Accordingly, the available frequencies may be 5925-6802.5, 6807.5-6593.75, and 6597.5-7125 MHz.

In some embodiments, the contiguous frequency segments of the available spectrum in the 6 GHz band frequency range from 5,925,000,000 Hz to 7,125,000,000 Hz may be stemmed from excising any portions of the band occupied by incumbents with which the RLAN would interfere.

For example, if the RLAN would interfere with incumbents using frequency spectrum having lower_freq=6,000,000,000 and upper_freq=6,100,000,000 and lower_freq=6,150,000,000 and upper_freq=6,200,000,000, then the available frequency segments would be:

```
"availableSpectrum":[
    {
        "frequencyRange" :{
            "lowFrequency":5925000000,
            "highFrequency":6000000000
        }
    },
    {
        "frequencyRange":{
            "lowFrequency":6100000000,
            "highFrequency":6150000000
        }
    },
    {
        "frequencyRange":{
            "lowFrequency":6200000000,
            "highFrequency": 7125000000
        }
    }
]
```

In this example, if the RLAN would interfere with incumbents using frequency spectrum with lower_freq=6,200,000,000 and upper_freq=6,300,000,000 and lower_freq=6,150,000,000 and upper_freq=6,200,000,000, then the available frequency segments would be:

```
"availableSpectrum":[
    {
        "frequencyRange":{
            "lowFrequency": 5925000000,
            "highFrequency":6200000000
        }
    },
    {
        "frequencyRange":{
            "lowFrequency": 6300000000,
            "highFrequency": 7125000000
        }
    }
]
```

If the RLAN would interfere with incumbents with frequency spectrum having lower_freq=5,925,000,000 and upper_freq=6,300,000,000 and lower_freq=6,450,000,000 and upper_freq=6,500,000,000, the available frequency segments would be:

```
"availableSpectrum":[
    {
        "frequencyRange":{
            "lowFrequency": 6300000000,
            "highFrequency":6450000000
        }
    },
    {
        "frequencyRange":{
            "lowFrequency": 6500000000,
            "highFrequency": 7125000000
        }
    }
]
```

Figure 5:
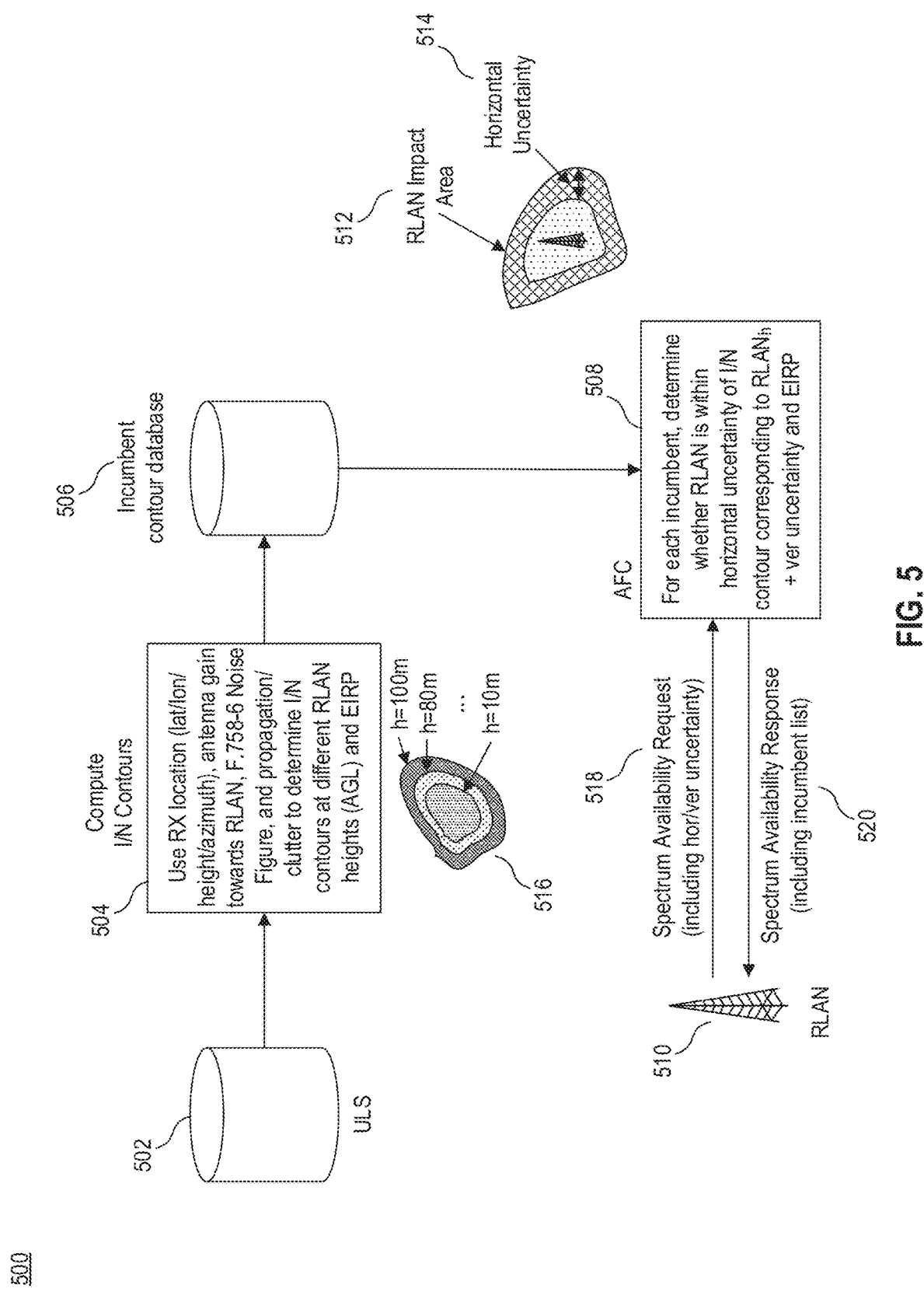
FIG. 5 depicts a schematic block diagram for an exemplary AFC spectrum availability calculation in accordance with certain disclosed embodiments.

FIG. 5 depicts a schematic block diagram of an exemplary AFC spectrum availability calculation in accordance with certain disclosed embodiments. As shown in FIG. 5, ULS 502 may communicate with a module 504 that computes I/N contours. In some exemplary embodiments, the I/N contours may be computed to use one or more data indicating receiver (RX) location (lat/lon/height/azimuth), F.1245 antenna sidelobe, F.758-6 Noise Figure, and propagation/clutter to determine I/N contours at different RLAN heights (AGL) and EIRP. In some embodiments, the module 504 is part of the AFC 508. In other embodiments, the module 504 may be implemented separate from the AFC. The computed contour information from the module 504 may be stored in a database, such as an incumbent contour database 506. For each incumbent, the AFC 508 may access contour information from the database 506 to determine whether the RLAN is located within a horizontal certainty of an I/N contour corresponding to an incumbent and the RLAN, and may also further use a vertical certainty and EIRP for such a determination. The exemplary diagram 516 represents different antenna heights (e.g., 10, 80, and 100 meters). FIG. 5 further shows an exemplary RLAN impact area 512 that the AFC may compute using an I/N contour from the database 506 and a horizontal uncertainty 514. In operation, the RLAN 510 may send a spectrum availability request 518 to the AFC 508. The AFC may use one or more I/N contours that it obtains from database 506, together with horizontal and/or vertical uncertainty values and/or an EIRP value for the RLAN, to generate a spectrum availability response 520 identifying available or unavailable incumbent spectrum. The AFC then returns the spectrum availability response 518 to RLAN 510.

As noted above, FIG. 5 discloses exemplary AFC functionality for responding to a Spectrum Availability Request from an RLAN. In some embodiments, I/N contours may be generated offline using the process described above and stored in the incumbent contour database. Upon receiving a Spectrum Availability Request from the RLAN, the AFC may extract from the database all I/N contours the RLAN would interfere with given the RLAN location, EIRP, and AGL height. The AFC may evaluate these I/N contours to determine which frequency segments (e.g., frequency channels or spectrum) are available for the RLAN use and may report this information back to the RLAN using the Spectrum Availability Response. Additional information may be provided in the response, including, for example, details on the interfered incumbents and the RLAN Impact Area.

In some embodiments, for RLAN informational purposes, and/or in response to a request of a specified region from the RLAN, the AFC may also provide a list of incumbent receivers within the region and the incumbent frequency range and UN contour in response to EIRP and height corresponding to the associated RLAN characteristics and required I/N protection level.

Further to some exemplary embodiments, the current AFC does not provide RLAN-to-RLAN interference protection. Specifically, multiple RLANs could request channel assignment and operation in a particular area and could subsequently operate simultaneously in this area on the same frequency. An extension to the approach disclosed herein to overcome this limitation may be to use the RLAN Impact Area as its exclusion zone once that RLAN begins transmitting, and to prevent other RLANs whose exclusion zones overlap with that of the operating RLAN from operating co-channel to the RLAN. The AFC-authorized, transmitting RLAN may notify the AFC of its transmit frequency so the AFC could then allow RLANs with overlapping Impact Areas to each transmit using orthogonal frequency assignments, thereby minimizing RLAN-to-RLAN interference.

In other embodiments, a closed-loop heartbeat, between the RLAN and AFC, may be implemented to allow the AFC to notify the RLAN of new incumbents in the RLAN vicinity and/or about any resulting changes of spectrum availability. This closed-loop signaling mechanism may enable the AFC to navigate the RLAN to a new frequency that does not interfere with incumbents and, potentially, other RLANs.

Figure 6:
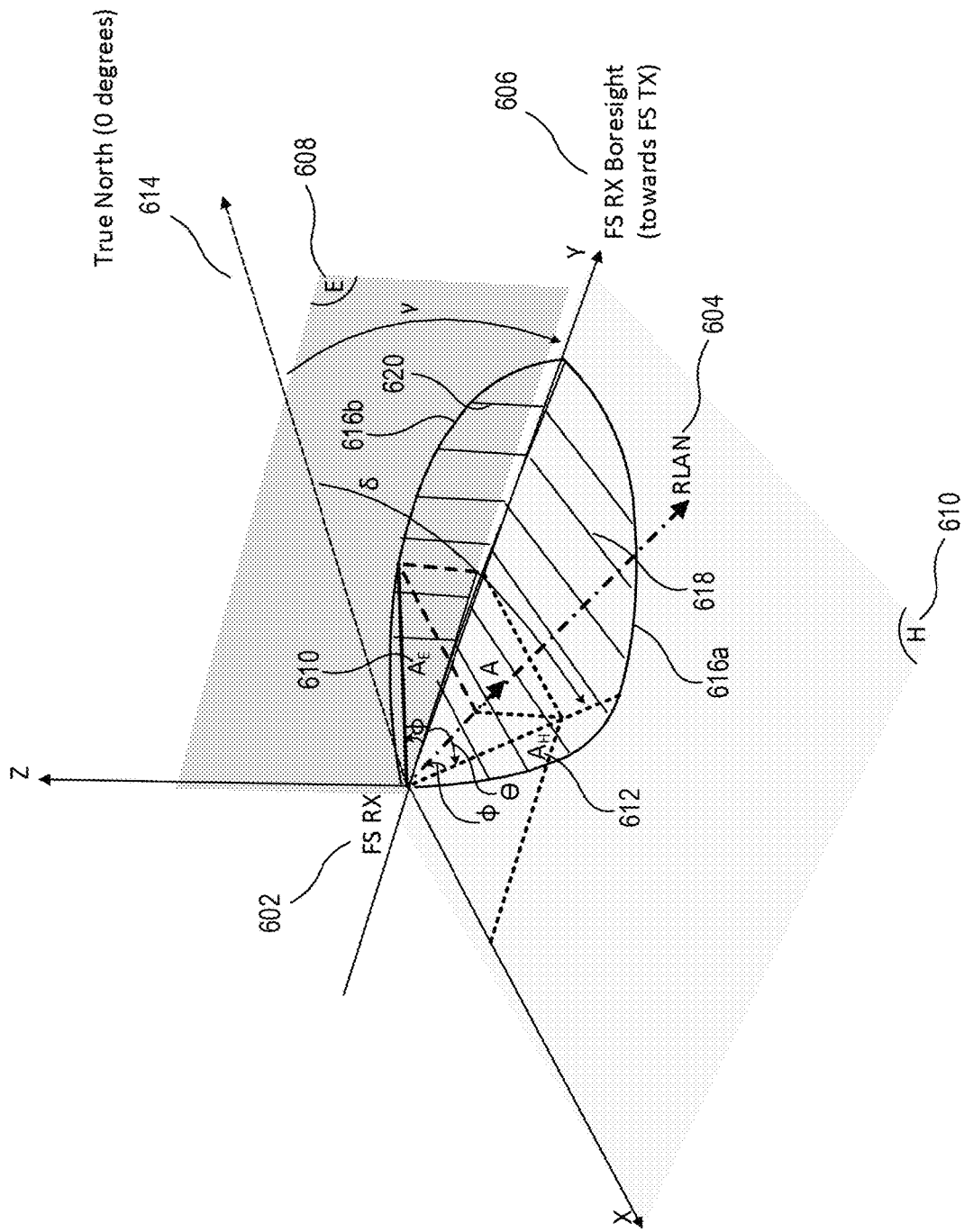
FIG. 6 depicts a graph of an exemplary antenna pattern showing angles for determining an exemplary angle θ from a plane in accordance with certain disclosed embodiments.

FIG. 6 depicts a graph 600 of an exemplary antenna pattern to determine the angle θ from a plane in accordance with certain disclosed embodiments. In FIG. 6, an exemplary Fixed Service (FS) RX 602 may be located at the origin of an X-Y-Z (Cartesian) coordinate system. The Y-axis's positive direction may be the boresight 606 of the FS receiver pointing toward a FS transmitter (TX). In this example, the direction of True North 614 may be represented by 0 degrees. The great circle path between the FS RX 606 and RLAN 604 may be along RLAN 604, and a vector A may be determined corresponding to RLAN 604 so as to point from the FS RX 606 to the RLAN 604. This vector may represent the true direction at which the RX gain is needed. The X-Y may be represented by H-plane 610, and the Y-Z plane may be represented by E-plane 608. The curves 616a and 616b in Y-Z and X-Y planes, respectively, may represent the intersection of the antenna pattern with E-plane 608 and H-plane 610, and the included line pieces 618 and 620 sweeping inside curves 616a and 616b, respectively, may facilitate visualization that the curves are in the aforesaid planes. The projection of vector A onto the H plane 610 may be represented by a vector $A_H$ 612, which may be specified by an azimuth angle θ between the Y-axis (θ equals the azimuth between the E-plane 608 (Y-Z plane) and the vector A. Then, a gain H(θ) may be computed from the pattern. $A_E$ 610, described below, may also be included.

In some embodiments, the computation may be done in a first section S1. The projection of vector A into the E plane 608 may be represented by vector $A_E$, which may be specified by the tilt angle Φ above the Y-axis (Φ equals the angle between H-plane 610 (X-Z plane) and the vector A. Then, gain E(Φ) may be computed from the pattern. Such a computation may also be done in a section S2.

In some embodiments, FIG. 6 depicts the relevant geometry for finding the azimuth θ. To determine the angle θ, which is the angle between the projection of vector A (in FIG. 6) into H-plane 610 (vector $A_H$ from the Y-axis (FS RX antenna boresight), Inverse Vincenty from the FS RX 606 may first be applied to the RLAN 604 to find: the angle δ of the vector $A_H$ from the True North direction 614 and the distance d between the FS RX 606 and RLAN 604. Then, Inverse Vincenty from the FS RX 606 may be applied to its TX (Y-axis in FIG. 6) to find angle γ of the boresight from the True North 614. Then, the off-boresight azimuth θ may be obtained based on the equation: θ=γ−δ. Then, the gain from H-plane antenna mask for θ, V(θ) may be looked up.

Figure 7:
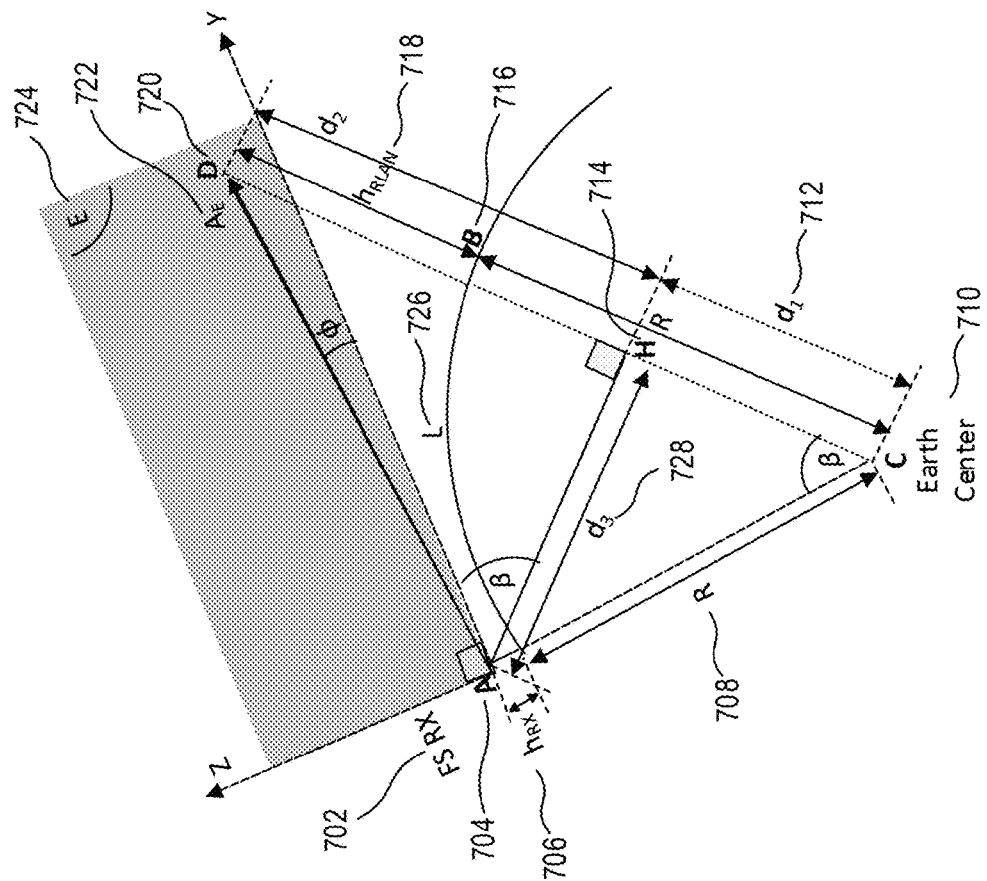
FIG. 7 depicts a schematic diagram showing angles and distances for determining an exemplary angle 1 above a plane in accordance with certain disclosed embodiments.

FIG. 7 depicts a schematic diagram of an exemplary angle Φ above a plane in accordance with certain disclosed embodiments. FIG. 7 depicts finding the Angle Φ above H-Plane 714. FIG. 7 is an exemplary geometry that may be used to determine angle Φ. FIG. 7 looks at the projection of RLAN into E-plane $A_E$ 722, where FX RX distance 702 to this projection is L 726. Here, the X-axis points outwards from the page and the E-plane 724 is shown as the background in FIG. 7 for clarity. The distance L 726 between FX RX and location of the RLAN projection into E-plane 724 may be obtained using equation (1-2) below. With distance L 726 and the Earth radius R 708 (approximation as sphere). Angle β that the Earth center forms with the FS TX and RLAN may be obtained using equation (1) below.

$$\beta = \frac{L}{R} \quad (1)$$

As shown in FIG. 7, in some embodiments, a perpendicular line AH may be drawn from the FS RX to the radius connecting the Earth center 710 to the RLAN projection in E plane 724. The length $d_1$ 712 of the line segment CH between the Earth center 710 and the intersection point H 714 can be written as equation (2) below. Here, $h_{TX}$ and $h_{RX}$ 706 may respectively be the FS TX and RX AGL heights.

$$d_1 = (R + h_{RX}) \cos \beta \tag{2}$$

Then, the length $d_2$ of the line segment HD can be written as equation (3) below where the second equality is the result of substituting $d_1$ from equation (2) above.

$$d_2 = R + h_{RLAN} - d_1 = h_{RLAN} - h_{RX} \cos \beta + R(1 - \cos \beta) \tag{3}$$

By the definition of sine, equation (4) may be obtained, $$d_3 = (R + h_{RX}) \sin \beta \tag{4}$$

By the definition of tangent, equation (5) may be obtained, $$\tan(\phi + \beta) = \frac{d_2}{d_3} \tag{5}$$

Using equations (3) and (4) to substitute $d_2$ and $d_3$ in equation (5), the following may be obtained:

$$\tan(\phi + \beta) = \frac{h_{TX} - h_{RX} \cos \beta + R(1 - \cos \beta)}{(R + h_{RX}) \sin \beta} \Rightarrow \phi \tag{6}$$

$$= \tan^{-1}\left(\frac{h_{TX} - h_{RX} \cos \beta + R(1 - \cos \beta)}{(R + h_{RX}) \sin \beta}\right) - \beta$$

In other embodiments, the gain from the E-plane antenna mask for $\Phi$, $E(\Phi)$, may be increased.

Figure 8:
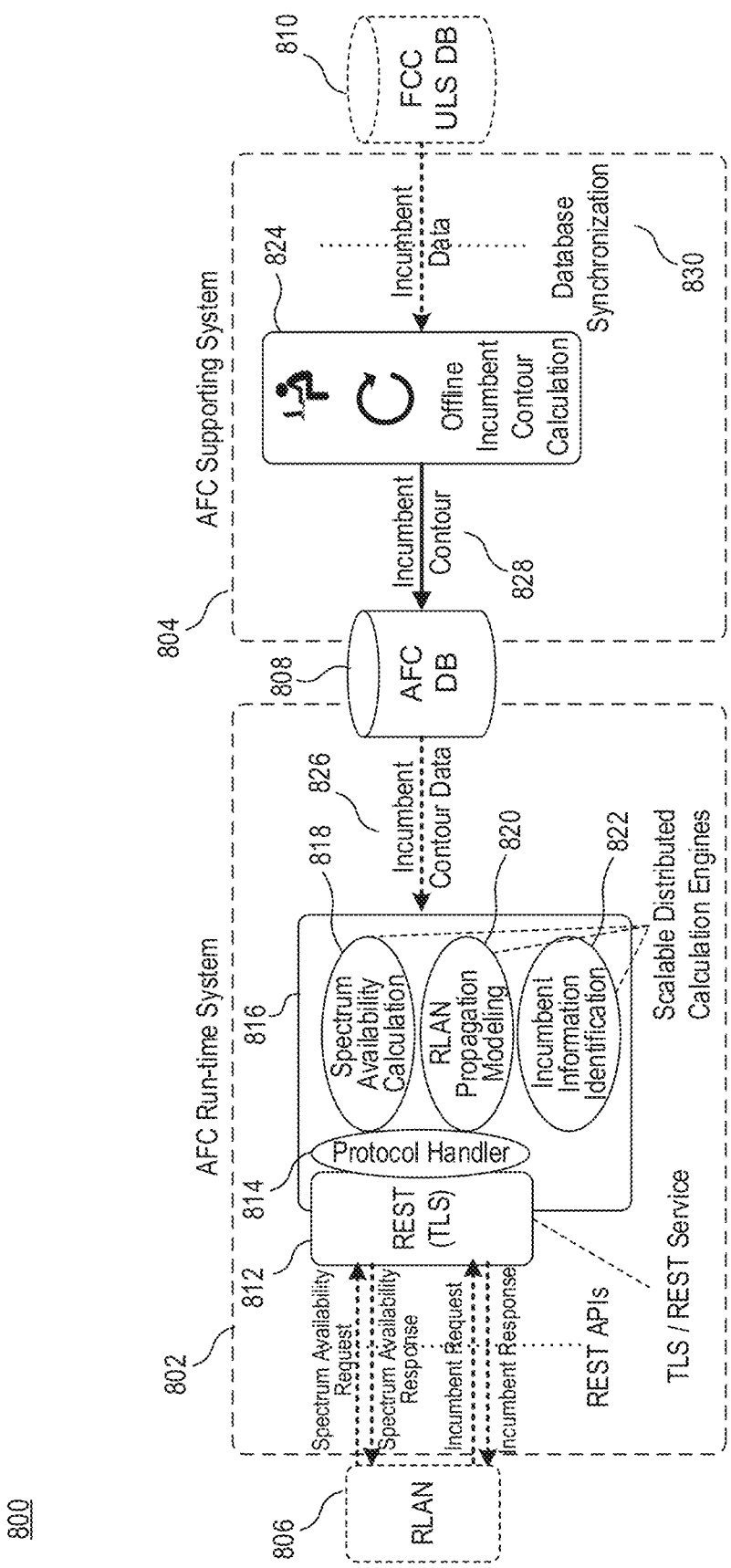
FIG. 8 depicts a schematic block diagram of an exemplary AFC architecture in accordance with certain disclosed embodiments.

FIG. 8 depicts a schematic block diagram of an exemplary AFC architecture in accordance with certain disclosed embodiments. As is shown in FIG. 8, the proposed AFC system 800 may comprise two subsystems, respectively the "AFC Run-Time System" 802 which may serve the RLAN 806 devices for spectrum availability and incumbent information inquiries, and the "AFC Supporting System," 804, which may collect, synchronize, and parse the FCC ULS database data of all relevant protected incumbents for the AFC Run-Time System 802 use. The two sub-systems 802 and 804 may interwork with each other through the AFC DB 808. The two sub-systems 802 and 804 may interface with external RLAN 806 devices and the FCC ULS database 810 via two sets of interfaces, respectively the AFC-RLAN interface and the AFC-ULS interface. As shown in FIG. 8, AFC Run-time system 802 may interface with AFC supporting system 804 at AFC DB 808. RLAN 806 may interface with AFC Run-time system 802. AFC supporting system 804 may interface with FCC ULS DB 810. AFC Run-time system 802 may include REST (TLS) 812, protocol handler 814, module 816 including spectrum availability calculation 818, RLAN propagation modeling 820, incumbent information identification 822, which all represent scalable distributed calculation engines. AFC supporting system 804 may comprise an offline incumbent contour calculation 824 and incumbent contour 828 and database synchronization 830. Other interfacing and communications not shown may be contemplated.

Figure 9:
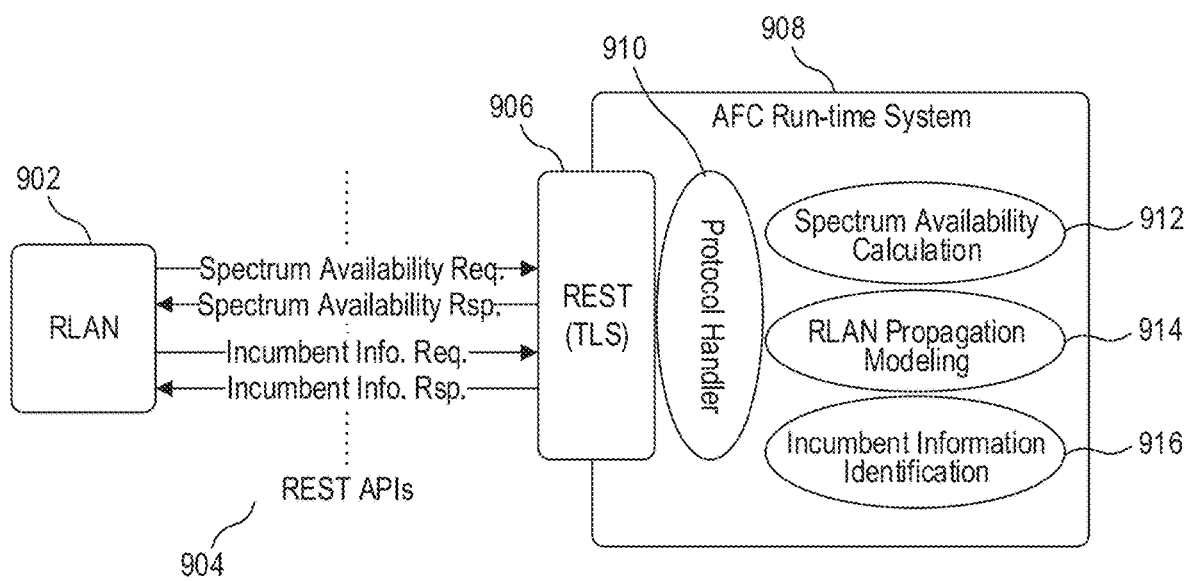
FIG. 9 depicts a schematic block diagram of an exemplary AFC-RLAN interface in accordance with certain disclosed embodiments.

FIG. 9 depicts a schematic block diagram 900 of an exemplary first AFC-RLAN 902 in accordance with certain disclosed embodiments. The AFC-RLAN interface, a TLS-secured RESTful (HTTPS) interface 906, shown in the exemplary embodiment of FIG. 9, may provide two sets of Application Programming Interfaces (APIs) 904: Spectrum Availability Request and Response APIs, including: a Spectrum Availability POST Request API for RLAN devices to post spectrum availability query requests; a Spectrum Availability POST Response API for AFC to respond to an RLAN Spectrum Availability POST Request; a Spectrum Availability GET Request API for RLAN devices to get the spectrum availability query results for a previously posted Spectrum Availability POST Request; a Spectrum Availability GET Response API for AFC to respond to an RLAN Spectrum Availability GET Request; and an initial POST Request, its subsequent GET Requests, and the corresponding Responses are uniquely tracked by a unique transaction number. As shown in FIG. 9, AFC Run-time system 908 comprises protocol handler 910, spectrum availability calculation 912, RLAN propagation modeling 914, and incumbent information identification 916.

In responding to an initial RLAN Spectrum Availability POST Request, the AFC may respond with a RESTful response if the required calculation can be done within a given reasonable time, or an "in-progress" response if a long calculation delay is expected, and in this case, the RLAN 902 device can try to retrieve the calculated results using Spectrum Availability GET Requests with the assigned transaction number.

A "segmenting-and-more" feature may be implemented in the AFC responses to RLAN requests to allow AFC to deliver and RLAN 902 to receive the responses in a partial, progressive, and "streamable" manner, allowing RLAN 902 and other types of user devices to control, to pace, to jump, to forward, to backward, to replay the responses in desired manners, and to adapt to network and RLAN data consumption configuration limitations.

In some embodiments, a "more" equals true response may indicate that there are more results to be retrieved for the initial Request, and a "portion number" in the subsequent RLAN GET Requests may tell the AFC which part of the results the RLAN is asking for. The "in-progress" and "segmenting-and-more" procedures of this interface are shown in FIG. 10.

Figure 10:
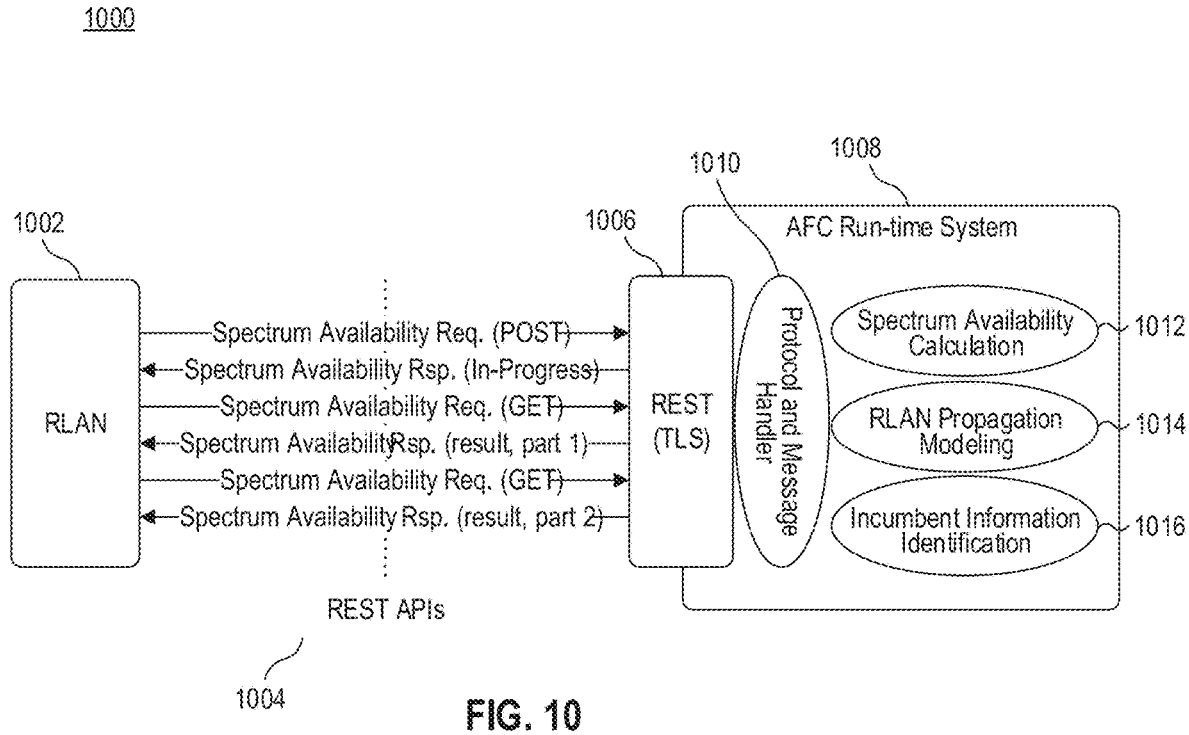
FIG. 10 depicts a schematic block diagram of another exemplary AFC-RLAN interface in accordance with certain disclosed embodiments.

FIG. 10 depicts a schematic block diagram of an exemplary second AFC-RLAN 1002 interface in accordance with disclosed embodiments. FIG. 10 depicts a TLS-secured RESTful (HTTPS) interface 1006 and incumbent information request and response APIs 1004, including: an Incumbent Information POST Request API for RLAN devices to post incumbent information query requests, an Incumbent Information POST Response API for AFC to respond to an RLAN Incumbent Information POST Request, an Incumbent Information GET Request API for RLAN devices to get the incumbent information query results for a previously posted Incumbent Information POST Request, and an Incumbent Information GET Response API for AFC to respond to an RLAN Incumbent Information GET Request. An initial POST Request and its subsequent GET Requests, as well as the corresponding Responses, may be uniquely tracked by a unique transaction number. As shown in FIG. 10, AFC Run-time system 1008 may comprise protocol handler 1010, spectrum availability calculation 1012, RLAN propagation modeling 1014, and incumbent information identification 1016.

In responding to an initial RLAN Incumbent Information POST Request, the AFC may respond with a RESTful response if required calculations can be done within a given reasonable time, or an "in-progress" response if a long calculation delay is expected. In this case, the RLAN device may try to retrieve the calculated results using Incumbent Information GET Requests with the assigned transaction number.

A "segmenting-and-more" feature may be implemented in the AFC responses to RLAN requests to cause the AFC to deliver and the RLAN to receive the responses in a partial, progressive, and "streamable" manner, allowing RLAN and other types of user devices to control, to pace, to jump, to forward, to backward, and to replay the responses in desired manners, and allow them to adapt to network and RLAN data consumption configuration limitations.

In some embodiments, a "more" equals true response may indicate that there are more results to be retrieved for the initial request, a "portion number" in the subsequent RLAN GET Requests may tell the AFC which part of the results the RLAN is asking for, and the "in-progress" and "more" procedures of this interface are shown in FIG. 8. Additional Request/Response pairs can be added to the interface as needed.

Figure 11:
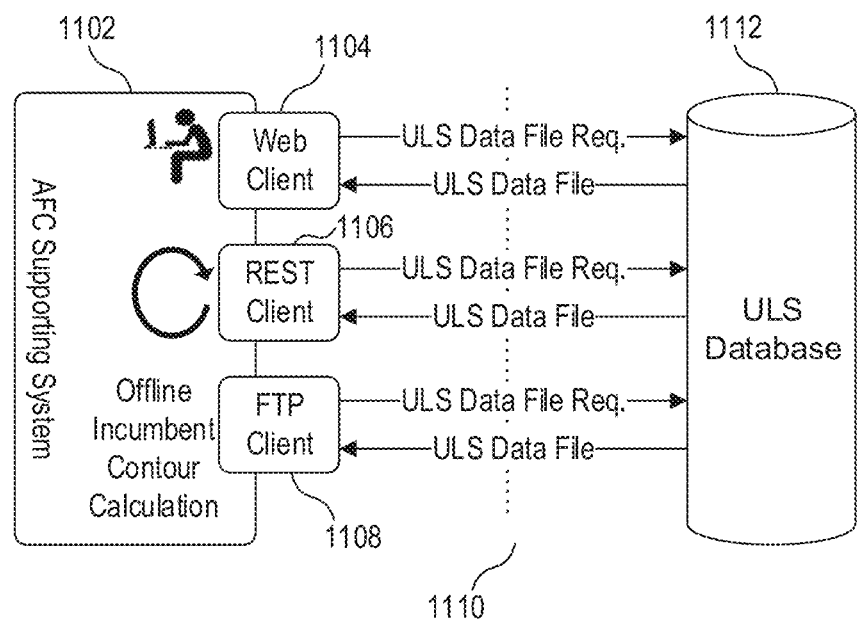
FIG. 11 depicts a schematic block diagram of an exemplary AFC-ULS interface in accordance with certain disclosed embodiments.

FIG. 11 depicts a schematic block diagram of an exemplary AFC-ULS interface 1100 in accordance with certain disclosed embodiments. The "AFC Run-Time System" or supporting system 1102 may be designed in an elastically extensible and distributable manner so that functional modules can be invoked in a parallel, distributed and serverless manner as needed to satisfy cloud deployment, scalability, availability, and recallability requirements. The distributable "AFC Run-Time System" 1102 modules are as shown in FIG. 11. As shown in FIG. 11, the AFC-ULS interface, shown in FIG. 11, may support acquiring data from the FCC ULS DB via different protocols. The initially supported protocols may comprise: Simple web interface protocol 1104, RESTful interface protocol 1106, and File Transfer Protocol (FTP) interface protocol 1108. ULS data file 1110 information may be transmitted to ULS database 1112.

Figure 12:
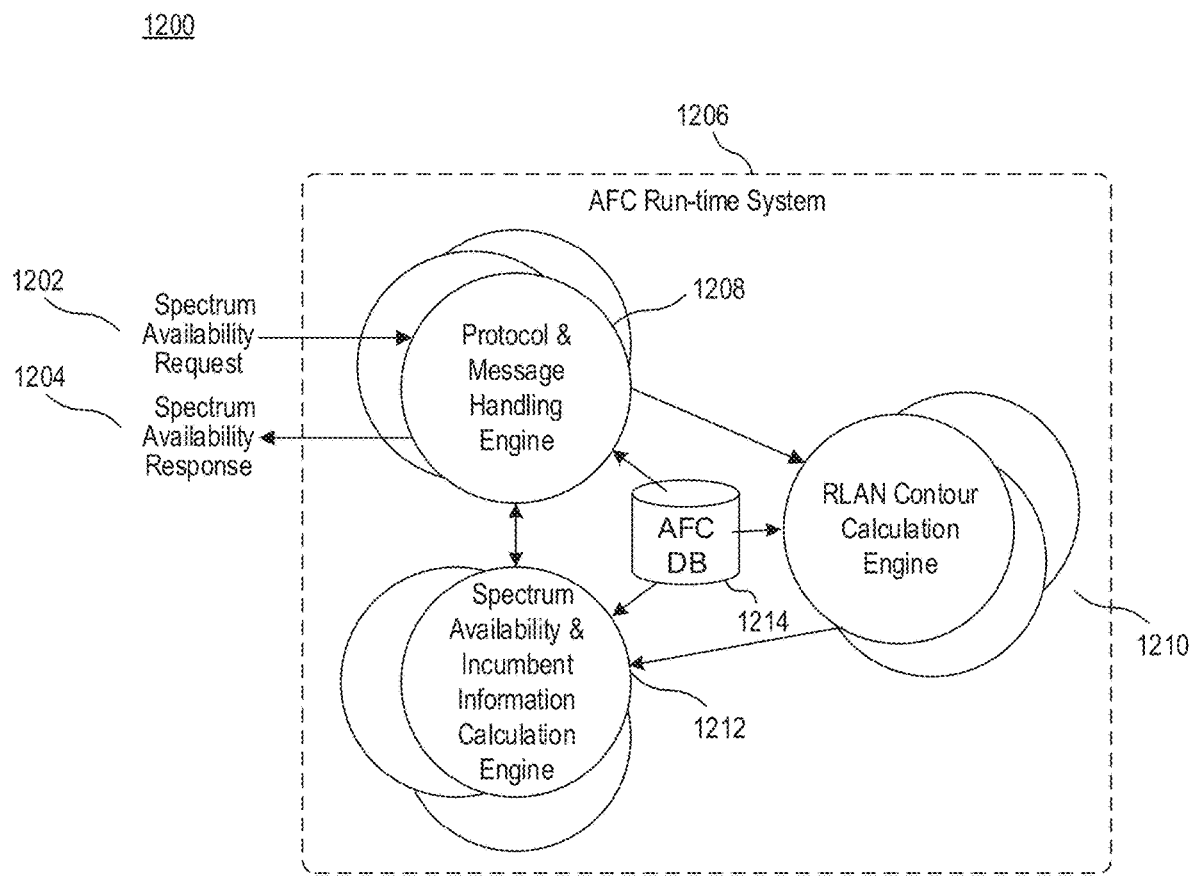
FIG. 12 depicts a schematic block diagram of exemplary AFC Run-time System Modules that may be used in accordance with certain disclosed embodiments.

FIG. 12 depicts a schematic block diagram 1200 of an exemplary AFC Run-time System Modules 1206 interfacing with AFC DB 1214 in accordance with certain disclosed embodiments. The Protocol and Message Handling Engine 1208 may handle the interface protocol and message with RLAN whereas the RLAN Contour Calculation Engine 1210 may perform all required propagation modeling to generate the RLAN Impact Area. The Spectrum Availability and Incumbent Information Calculation Engine 1212 may perform all required calculations consistent with this disclosure. The Protocol and Message Handling Engine 1208 may receive a spectrum availability request 1202 and spectrum availability response 1204.

Figure 13:
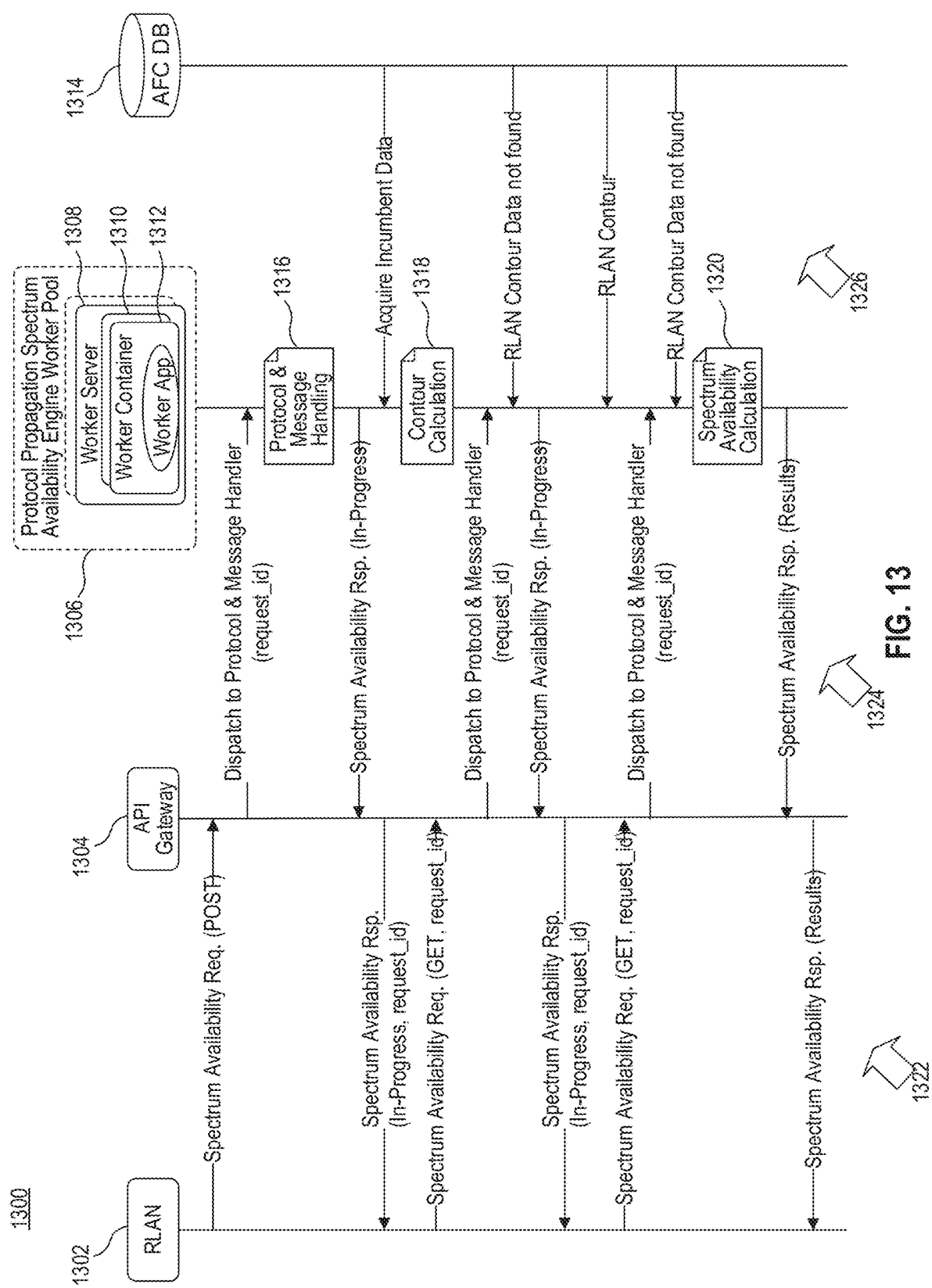
FIG. 13 depicts a schematic block diagram of an exemplary Spectrum Availability Request Call Flow that may be used in accordance with certain disclosed embodiments.

FIG. 13 depicts a schematic block diagram of an exemplary Spectrum Availability Request Call Flow 1300, in accordance with certain disclosed embodiments. FIG. 13 illustrates an exemplary system with communications 1322 between an RLAN 1302 and API Gateway 1304, communications 1324 between the API Gateway 1304 and a Protocol Propagation Spectrum Availability Engine Worker Pool 1306, and communications 1326 between the Protocol Propagation Spectrum Availability Engine Worker Pool 1306 and an AFC database 1314.

In the exemplary embodiment of FIG. 13, the RLAN 1302 may communicate at 1322 with API gateway 1304, which may communicate at 1324 with Propagation and Spectrum Availability Engine Worker Pool 1306, which may communicate at 1326 with AFC DB 1314. In this diagram, the Protocol, Propagation and Spectrum Availability Engine Worker Pool 1306 may hold all the functional module engines that can be invoked concurrently in parallel as many times as needed in a distributed and serverless manner, thereby allowing an elastic scaling of the system handling capacity, enabling cloud-based running of the modules, and preserving native high availability and reliability. The Incumbent Information Request may be handled in the similar manner. The Propagation and Spectrum Availability Engine Worker Pool 1306, e.g., executing in the AFC, may comprise, for example, a worker server 1308, a worker container 1310, and a worker application 1312. The Propagation and Spectrum Availability Engine Worker Pool 1306 also may comprise, for example, one or more modules for protocol message handling 1316, contour calculation 1318, and spectrum availability calculation 1320.

The following describes RLAN Interface Message Examples of message formats that could be used for various types of messages in accordance with certain disclosed embodiments herein.

A.1 Spectrum Availability Request

```
{
    "spectrumAvailabilityRequest": [
        // request message Is any array of Individual requests, this is to allow
        // aggregating requests from multiple RLANs into one message
        // -- used in e.g. domain proxy case if needed
        {
            "rlanId": "abc123",
            "latitude": 37.419735,
            "longitude": -122.072205,
            "EIRP": 30, "height": 6,
            "horUncertainty":10,
            "verUncertainty":3,
            "cellEdgeRSL": -85
        },
        // additional requests If any
        {
            // . . . . . . . .
        }
    ]
}
```

A.2 Spectrum Availability Response

```
{
    "spectrumAvailabilityResponse": [{
        "requestId": "unique request id in string format",
        "rlanId": "abc123",
        "status": "ok",
        "impactArea": {
    "type": "FeatureCollection",
    "features": [{
        "type": "Feature",
        "properties": {
            "latitude": 37.419735,
            "longitude": -122.072205,
            "EIRP": 30,
            "height": 6,
            "horUncertainty": 10,
            "verUncertainty": 3,
            "cellEdgeRSL": -85
        },
        "geometry": {
            "type": "Polygon",
            "coordinates": [
                [
                    [-74.216527777778,41.197198459596],
                    [-74.202515421586,41.185771703074],
                    [-74.189302439432,41.168445740081],
                    [-74.175673909272,41.168371786049],
                    [-74.162124708549,41.167214216680],
                    [-74.146435538745,41.184546725624],
                    [-74.130725919630,41.195907355798],
                    [-74.114369447790,41.207613326543],
                    [-74.337043717128,41.226668423861],
                    [-74.323798372830,41.238741228359],
                    [-74.307977938389,41.236094866833],
                    [-74.294374634410,41.250828423695],
                    [-74.278589778268,41.249145136434],
                    [-74.262833611924,41.246193646571],
                    [-74.246722580490,41.232072298973],
```

-continued

```
        [-74.231406431859,41.222902948569],
        [-74.216527777778,41.197198459596]
      ]
    ]
  }
}]
},
  "availableSpectrum": [{
      "lowFrequency": 6110000000,
      "highFrequency": 6120000000
    },
    {
      "lowFrequency": 6120000000,
      "highFrequency": 6130000000
    }
  ],
  "incumbentReceiver": [{
      "call Sign": "WQAN627",
      "latitude": 37.419735,
      "longitude": -122.072205,
      "frequencyRange": {
          "lowFrequency": 6130000000,
          "highFrequency": 6230000000
      },
      "entityName": "Incumbent1"
    },
    {
      "call Sign": "WQAN628",
      "latitude": 38.419735,
      "longitude": -121.072205,
      "frequencyRange": {
          "lowFrequency": 6010000000,
          "highFrequency": 6110000000
      },
      "entityName": "Incumbent2"
    }
  ]
},
// additional response If any
{
    // ........
}]
}
```

A3 Incumbent Information Request

```
{
  "incumbentInformationRequest": [
  // request message Is any array of Individual requests, this is to allow
  // aggregating requests from multiple RLANs into one message
  // -- used in e.g. domain proxy case if needed
    {
      "latitude": 37.419735,
      "longitude": -122.072205,
      "EIRP": 6,
      "height": 6,
      "radiusOfInterest": 6,
      "verUncertainty", 6
    },
    // additional requests If any
    {
      // ........
    }
  ]
}
```

A.4 Incumbent Information Response

```
{
  "incumbentInformationResponse": [{
    "requestid":   "incumbent-info-req-1547501757-1707516525",
    "status":      "ok",
    "portionIndex":    0,
    "more":        false,
    "response":    [{
```

```
      "type": "FeatureCollection",
      "features":      [{
              "type": "Feature",
              "properties":    {
              "call Sign": "WFSS1234",
              "lowerfreq": 6000,
              "upperfreq": 6100,
              "txLatitude": 0,
              "txLongitude": 0,
              "rxLatitude": 0,
              "rxLongitude": 0,
              "Entity Name": "incumbent1"
              },
         "geometry":    {
              "type": "Polygon",
              "coordinates": [[[37.4216247393972,
       -122.072205], [37.4216244515736, -122.072163648325],
       [37.4216235881903, -122.072122309248], [37.4216221495105,
       -122.07208099536], [37.4216201359724, -122.072039719249],
       [37.4216247393972, -122.072205]]]
              }
         }]
      },
   }]
}
```

Figure 14:
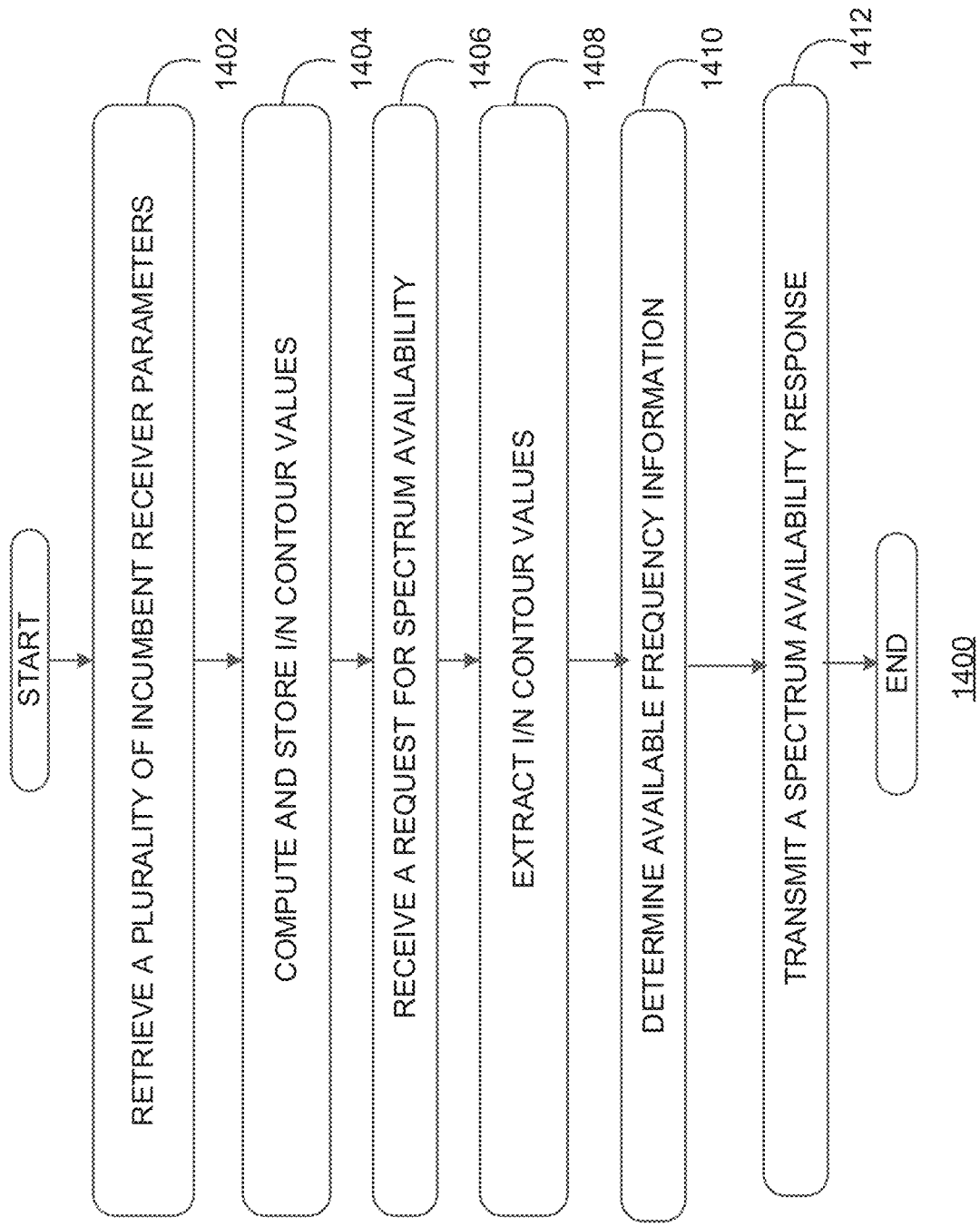
FIG. 14 depicts a flowchart of an exemplary process that an AFC may perform for determining one or more available frequencies that may be assigned to an RLAN in a shared spectrum wireless system in accordance with certain disclosed embodiments.

FIG. 14 depicts a flowchart of an exemplary process 1400 that an AFC may perform for managing spectrum in a shared spectrum available to at least one RLAN in a wireless network in accordance with certain disclosed embodiments. At step 1402, the AFC may retrieve a plurality of parameters for one or more high-priority users in the wireless network, wherein the plurality of parameters includes location and frequency information associated with each of the one or more high-priority users. AFC may also retrieve, from a ULS database, a plurality of incumbent receiver parameters, wherein the parameters include location and frequency information. The plurality of incumbent receiver parameters may be retrieved from a universal licensing system database. The high-priority users may comprise at least one incumbent user that had access to a frequency range in the shared spectrum before that range was included in the shared spectrum.

At step 1404, the AFC may compute, based on the retrieved parameters, a plurality of UN contour values, and may store the plurality of UN contour values in a database. The AFC may also compute, based on the retrieved parameters, a plurality of incumbent receiver I/N contour values, wherein the I/N contour values are stored in an incumbent contour database. The AFC may also determine, based on an RLAN antenna gain, an indication of RLAN power in a direction of a high-priority user, and compute, based on the determined indication of RLAN power, the plurality of the I/N contour values. AFC may also determine, based on the available frequency information and a location of the RLAN, an AGL height of the RLAN, and may compute, based on the AGL height and an RLAN power, an RLAN impact area. AFC may also compute a distance from the RLAN to a plurality of UN contours. In other embodiments, AFC may determine, based on an RLAN antenna gain, an RLAN effective isotropic rated power in a direction of an incumbent receiver, and may compute, based on the determination, a plurality of the UN contour values. In other embodiments, AFC may determine, based on the location and the frequency information, an AGL height of the RLAN, and may compute, based on the AGL height and an RLAN effective isotropic rated power, an RLAN impact area. In some embodiments, AFC may compute a distance from the RLAN to a plurality of incumbent contours.

At step 1406, the AFC may receive, from the RLAN in the wireless network, a request for spectrum availability, wherein the received request includes at least a first value. AFC may also receive, from at least one RLAN, a request for spectrum availability, wherein the request includes a plurality of uncertainty values. The first value in the request for spectrum availability may be a horizontal uncertainty value or a vertical uncertainty value. The spectrum availability request and the available frequency response may be encoded using a secure protocol. In some embodiments, the plurality of uncertainty values may comprise horizontal uncertainty values and vertical uncertainty values.

At step 1408, the AFC may extract, based on the first value in the request for spectrum availability, I/N contour values from the database exceeding a threshold value. The AFC may extract, based on the uncertainty values, I/N contour values exceeding an interference threshold from the incumbent contour database. The threshold value may be, for example, selected from one of −6 dB, 0 dB, or 10 dB. If the I/N contour value is 0.5, then the 10 dB contours are chosen. Alternatively, the threshold value may be predetermined, for example selected in advance by a system administrator, or alternatively may be a dynamically determined value selected by the AFC depending on one or more network conditions.

At step 1410, the AFC may determine, based on the extracted I/N contour values, available frequency information corresponding to the received request for spectrum availability. Available frequency information may be related to an incumbent receiver and may provide commercial use of 150 MHz of spectrum in the 3.5 GHz band, and new bands such as but not limited to the 6 GHz band (5.925 to 7.125 GHz) may be available for shared spectrum use.

At step 1412, the AFC may transmit a spectrum availability response comprising the available frequency information. AFC may also transmit, based on the extraction, a spectrum availability response, wherein the spectrum availability response message includes interference and available frequency information. The spectrum availability response may further include interference information. AFC may also transmit, if the RLAN is determined to be located at a distance less than a horizontal uncertainty value from an extracted I/N contour value, an indication in the spectrum availability response that spectrum is unavailable. AFC may also identify high-priority users in the RLAN vicinity in the spectrum availability response. AFC may identify at least one change in spectrum availability in the spectrum availability response. In some embodiments, AFC may transmit, if an RLAN is determined to be positioned at a distance less than a horizontal uncertainty value, incumbent receiver channels as unavailable. In some embodiments, the AFC may automatically notify an RLAN of new incumbent receivers in the RLAN vicinity and any changes in spectrum availability. In some embodiments, the AFC may transmit a spectrum availability request and response messages encoded using JSON and using a secure protocol.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. For example, the exemplary disclosed embodiments are described in terms of interference-to-noise power contours, although those skilled in the art will appreciate that other criteria, such as signal-to-noise or carrier-to-noise ratios, compared to a threshold value may be used to determine the contours for incumbent receivers consistent with the disclosed embodiments herein. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for managing frequency access in a shared spectrum available to a radio local access network (RLAN) in a wireless network, the method comprising:
  retrieving a plurality of parameters for one or more high-priority users in the wireless network, wherein the plurality of parameters includes location and frequency information associated with each of the one or more high-priority users;
  computing, based on the retrieved parameters, a plurality of interference-to-noise power ratio (I/N) contours;
  storing the plurality of I/N contours in a database;
  receiving, from an RLAN device in the wireless network, a request for spectrum availability, wherein the received request includes at least a first value;
  extracting, based on at least the first value in the request for spectrum availability, an I/N contour from the database matching RLAN device parameters;
  determining, based on the extracted I/N contour, available frequency information corresponding to the received request for spectrum availability; and
  transmitting, to the RLAN device, the available frequency information.

2. The method of claim 1, wherein determining, based on the extracted I/N contour, available frequency information further comprises determining a presence or an absence of interference based on a distance from the RLAN device to the extracted I/N contour.

3. The method of claim 1, further comprising calculating an RLAN impact area,
  wherein determining, based on the extracted I/N contour, available frequency information further comprises determining a presence or an absence of interference based on whether the calculated RLAN impact area intersects the extracted I/N contour.

4. The method of claim 1, wherein the plurality of parameters is retrieved from a universal licensing system (ULS) database.

5. The method of claim 1, wherein the high-priority users comprise at least one incumbent user that had access to a frequency range in the shared spectrum.

6. The method of claim 1, wherein the available frequency information further includes interference information.

7. The method of claim 1, further comprising:
  determining, based on an RLAN device antenna gain, an indication of RLAN device power in a direction of a high-priority user; and
  computing, based on the retrieved parameters and the determined indication of RLAN device power, the plurality of the I/N contours.

8. The method of claim 1, further comprising calculating an RLAN impact area, wherein calculating the RLAN impact area comprises:

determining, based on the available frequency information and a location of the RLAN device, an above ground level (AGL) height of the RLAN device; and computing, based on the AGL height and an RLAN power, the RLAN impact area.

9. The method of claim 1, wherein the first value in the request for spectrum availability comprises a horizontal uncertainty value or a vertical uncertainty value.

10. The method of claim 1, further comprising:

transmitting, when the RLAN device is determined to be located at a distance less than a horizontal uncertainty value from the extracted I/N contour, an indication in the available frequency information that spectrum is unavailable.

11. The method of claim 1, further comprising calculating an RLAN impact area using RLAN device reported parameters, the RLAN device reported parameters comprising at least one of cell edge signal level or propagation modeling.

12. The method of claim 1, further comprising calculating an RLAN impact area, wherein calculating the RLAN impact area comprises approximating the RLAN impact area using a circle with a radius calculated based on RLAN device capabilities.

13. The method of claim 1, further comprising:

identifying high-priority users in a vicinity of the RLAN device in the available frequency information.

14. The method of claim 1, further comprising:

identifying at least one change in spectrum availability in the available frequency information.

15. The method of claim 1, further comprising:

computing a distance from the RLAN device to the plurality of I/N contours.

16. The method of claim 1, wherein the request for spectrum availability and the available frequency information are encoded using a secure protocol.

17. The method of claim 1, wherein the plurality of I/N contours are computed using conservative assumptions regarding the high-priority users.

18. The method of claim 1, wherein the plurality of I/N contours are computed using a conservative model for an incumbent receiver antenna pattern.

19. A system for managing frequency access in a shared spectrum available to a radio local access network (RLAN) in a wireless network, the system comprising:

one or more processors; and a memory storing instructions that, when executed by the one or more processors, cause the system to:

retrieve a plurality of parameters for one or more high-priority users in the wireless network, wherein the plurality of parameters includes location and frequency information associated with each of the one or more high-priority users;

compute, based on the retrieved parameters, a plurality of I/N contours;

store the plurality of I/N contours in a database;

receive, from an RLAN device in the wireless network, a request for spectrum availability, wherein the received request includes at least a first value;

extract, based on the first value in the request for spectrum availability, an I/N contour from the database matching RLAN device parameters;

determine, based on the extracted I/N contour values, available frequency information corresponding to the received request for spectrum availability; and transmit, to the RLAN device, the available frequency information.

20. The system of claim 19, wherein determining, based on the extracted I/N contour, available frequency information further comprises determining a presence or an absence of interference based on a distance from the RLAN device to the extracted I/N contour.

21. The system of claim 19, wherein the memory stores instructions that, when executed by the one or more processors, cause the system to calculate an RLAN impact area, and wherein determining, based on the extracted I/N contour, available frequency information further comprises determining a presence or an absence of interference based on whether the calculated RLAN impact area intersects the extracted I/N contour.

22. The system of claim 19, wherein the plurality of parameters is retrieved from a universal licensing system (ULS) database.

23. The system of claim 19, wherein the high-priority users comprise at least one incumbent user that had access to a frequency range in the shared spectrum.

24. The system of claim 19, wherein the available frequency information further includes interference information.

25. The system of claim 19, wherein the memory stores instructions that, when executed by the one or more processors, cause the system to:

determine, based on an RLAN device antenna gain, an indication of RLAN device power in a direction of a high-priority user; and compute, based on the retrieved parameters and the determined indication of RLAN device power, the plurality of the UN contours.

26. The system of claim 19, wherein the memory stores instructions that, when executed by the one or more processors, cause the system to:

calculate an RLAN impact area, wherein calculating the RLAN impact area comprises:

determining, based on the available frequency information and a location of the RLAN device, an above ground level (AGL) height of the RLAN device; and computing, based on the AGL height and an RLAN power, the RLAN impact area.

27. The system of claim 19, wherein the first value in the request for spectrum availability comprises a horizontal uncertainty value or a vertical uncertainty value.

28. The system of claim 19, wherein the memory stores instructions that, when executed by the one or more processors, cause the system to:

transmit, when the RLAN device is determined to be located at a distance less than a horizontal uncertainty value from the extracted UN contour, an indication in the available frequency information that spectrum is unavailable.

29. The system of claim 19, wherein the memory stores instructions that, when executed by the one or more processors, cause the system to calculate an RLAN impact area using RLAN device reported parameters, the RLAN device reported parameters comprising at least one of cell edge signal level or propagation modeling.

30. The system of claim 19, wherein the memory stores instructions that, when executed by the one or more processors, cause the system to calculate an RLAN impact area, and wherein calculating the RLAN impact area comprises approximating the RLAN device impact area using a circle with a radius calculated based on RLAN device capabilities.

31. The system of claim 19, wherein the memory stores instructions that, when executed by the one or more processors, cause the system to:
   identify high-priority users in a vicinity of the RLAN device in the available frequency information.

32. The system of claim 19, wherein the memory stores instructions that, when executed by the one or more processors, cause the system to:
   identify at least one change in spectrum availability in the available frequency information.

33. The system of claim 19, wherein the memory stores instructions that, when executed by the one or more processors, cause the system to:
   compute a distance from the RLAN device to the plurality of I/N contours.

34. The system of claim 19, wherein the request for spectrum availability and the available frequency information are encoded using a secure protocol.

35. The system of claim 19, wherein the plurality of I/N contours are computed using conservative assumptions regarding the high-priority users.

36. The system of claim 19, wherein the plurality of I/N contours are computed using a conservative model for an incumbent receiver antenna pattern.

37. A non-transitory computer-readable medium comprising instructions that, when executed by at least one processor, cause the at least one processor to perform operations including:
   retrieving a plurality of parameters for one or more high-priority users in the wireless network, wherein the plurality of parameters includes location and frequency information associated with each of the one or more high-priority users;
   computing, based on the retrieved parameters, a plurality I/N contours;
   storing the plurality of I/N contours in a database;
   receiving, from a radio local access network (RLAN) device in a wireless network, a request for spectrum availability, wherein the received request includes at least a first value;
   extracting, based on at least the first value in the request for spectrum availability, an I/N contour from the database matching RLAN device parameters;
   calculating an RLAN device impact area;
   determining, based on the extracted I/N contour, available frequency information corresponding to the received request for spectrum availability; and
   transmitting, to the RLAN device, the available frequency information.

* * * * *

UNITED STATES PATENT AND TRADEMARK OFFICE
CERTIFICATE OF CORRECTION

PATENT NO. : 11,234,135 B2
APPLICATION NO. : 16/867164
DATED : January 25, 2022
INVENTOR(S) : Samuel Jay Macmullan et al.

It is certified that error appears in the above-identified patent and that said Letters Patent is hereby corrected as shown below:

In the Specification

Column 4, Line 45, "UN" should read as --I/N--.

Column 5, Line 2, "UN" should read as --I/N--.

Column 5, Line 11, "1" should read as --Φ--.

Column 6, Line 44, "UN" should read as --I/N--.

Column 6, Line 51, "UN" should read as --I/N--.

Column 6, Line 53, "UN" should read as --I/N--.

Column 6, Line 63, "Accordance" should read as --accordance--.

Column 9, Lines 22-29, In the equation:

$$EIRP\_lookup = \max\left(20, \min\left(36, \text{ceil}\left(\frac{EIRP}{4.0}\right)*4\right)\right) \text{heigh\_lookup}$$
$$= \max\left(20, \min\left(100, \text{ceil}\left(\frac{height + verUncertainty}{20.0}\right)*20\right)\right)$$

"heigh" should read as --height--.

Column 8, Line 46, "UN" should read as --I/N--.

Column 11, Line 36, "UN" should read as --I/N--.

Column 18, Line 43, "UN" should read as --I/N--.

Column 18, Line 44, "UN" should read as --I/N--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,234,135 B2

Column 18, Line 57, "UN" should read as --I/N--.

Column 18, Line 61, "UN" should read as --I/N--.

Column 19, Line 14, "UN" should read as --I/N--.

Column 19, Line 16, "UN" should read as --I/N--.

In the Claims

Claim 15, Column 21, Line 33, "UN" should read as --I/N--.

Claim 25, Column 22, Line 32, "UN" should read as --I/N--.

Claim 28, Column 22, Line 51, "UN" should read as --I/N--.